(12) United States Patent
Kawahira et al.

(10) Patent No.: US 10,962,839 B2
(45) Date of Patent: Mar. 30, 2021

(54) LIQUID CRYSTAL DISPLAY PANEL AND METHOD FOR PRODUCING LIQUID CRYSTAL DISPLAY PANEL

(71) Applicant: SHARP KABUSHIKI KAISHA, Sakai (JP)

(72) Inventors: Yuichi Kawahira, Sakai (JP); Kiyoshi Minoura, Sakai (JP); Akira Sakai, Sakai (JP); Takako Koide, Sakai (JP); Masahiro Hasegawa, Sakai (JP); Koji Murata, Sakai (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 66 days.

(21) Appl. No.: 16/203,176

(22) Filed: Nov. 28, 2018

(65) Prior Publication Data

US 2019/0163004 A1 May 30, 2019

(30) Foreign Application Priority Data

Nov. 29, 2017 (JP) .............................. JP2017-228803

(51) Int. Cl.
*G02F 1/13363* (2006.01)
*G02F 1/1335* (2006.01)
(Continued)

(52) U.S. Cl.
CPC ........ *G02F 1/13363* (2013.01); *G02F 1/1337* (2013.01); *G02F 1/133512* (2013.01); *G02F 1/133514* (2013.01); *G02F 1/133528* (2013.01); *G02F 1/134309* (2013.01); *G02F 2001/133519* (2013.01); *G02F 2001/133541* (2013.01);
(Continued)

(58) Field of Classification Search
CPC .......................................... G02F 2001/133638
See application file for complete search history.

(56) References Cited

U.S. PATENT DOCUMENTS

2005/0142464 A1* 6/2005 Moriya ............... G02F 1/13363
430/7
2007/0298194 A1* 12/2007 Fukagawa .............. G02B 5/305
428/1.33

(Continued)

FOREIGN PATENT DOCUMENTS

JP 2008-256750 A 10/2008

*Primary Examiner* — Michael H Caley
*Assistant Examiner* — Jonathan Y Jung
(74) *Attorney, Agent, or Firm* — ScienBiziP, P.C.

(57) ABSTRACT

The liquid crystal display panel includes in the following order from a viewing surface side to a back surface side: a first polarizer; a first λ/4 retardation layer; a first substrate; a second λ/4 retardation layer; a liquid crystal layer; a second substrate; and a second polarizer, the liquid crystal display panel being in a transverse electric field mode, the first substrate including a color filter layer in a display region, the second λ/4 retardation layer being a single layer covering the color filter layer and including a first retardation portion in an end region of the display region and a second retardation portion in a central region of the display region, the first retardation portion having a greater thickness than the second retardation portion, and the first retardation portion and the second retardation portion differing from each other in in-plane retardation by 10 nm or less.

8 Claims, 8 Drawing Sheets

(51) Int. Cl.
*G02F 1/1337* (2006.01)
*G02F 1/1343* (2006.01)

(52) U.S. Cl.
CPC ............ *G02F 2001/133638* (2013.01); *G02F 2001/134372* (2013.01); *G02F 2201/121* (2013.01); *G02F 2201/123* (2013.01); *G02F 2201/38* (2013.01)

(56) References Cited

U.S. PATENT DOCUMENTS

2009/0268133 A1* 10/2009 Yoshimi ............ G02F 1/133514
　　　　　　　　　　　　　　　　　　　　　　　349/107
2017/0291360 A1* 10/2017 Franke .................... B05D 3/06

\* cited by examiner

LIQUID CRYSTAL DISPLAY PANEL AND METHOD FOR PRODUCING LIQUID CRYSTAL DISPLAY PANEL

CROSS-REFERENCE TO RELATED APPLICATIONS

The present application claims priority under 35 U.S.C. § 119 to Japanese Patent Application No. 2017-228803 filed on Nov. 29, 2017, the contents of which are incorporated herein by reference in their entirety.

BACKGROUND OF THE INVENTION

Field of the Invention

The present invention relates to liquid crystal display panels and methods for producing a liquid crystal display panel. In particular, the present invention relates to a transverse electric field mode liquid crystal display panel and a method for producing the liquid crystal display panel.

Description of Related Art

Liquid crystal display panels are used in applications such as televisions, smartphones, tablet computers, PCs, and car navigation systems. Various performances are required in these applications. For example, JP 2008-256750 A suggests a liquid crystal display panel that is intended to achieve enhanced optical performance.

BRIEF SUMMARY OF THE INVENTION

Conventional liquid crystal display panels, however, have a low visibility in bright places such as outdoors. The present inventors made various studies on the cause of the low visibility, and found that the cause is the external light reflection (surface reflection and internal reflection) of the liquid crystal display panel, which increases the luminance in the black display state, thereby decreasing the contrast ratio.

For an increase in the visibility (reduction of external light reflection) in bright places such as outdoors, the present inventors then focused on a configuration in which a circular polarizer (stack of a linear polarizer and a λ/4 layer) is disposed on the side remote from the liquid crystal layer (viewing surface side) of the viewing surface side substrate of the paired substrates between which the liquid crystal layer is sandwiched. Such a circular polarizer, however, is difficult to apply to a liquid crystal display panel that is in a transverse electric field mode such as the fringe field switching (FFS) mode or the in-plane switching (IPS) mode for better viewing angle characteristics. This is because when a circular polarizer is disposed on each of the viewing surface side and the back surface side of a transverse electric field mode liquid crystal display panel, the panel is always in the white (bright) display state with or without voltage applied, failing to achieve a black (dark) display state.

The inventors then focused on a configuration in which a circular polarizer is disposed on the side remote from the liquid crystal layer (viewing surface side) of the viewing surface side substrate of the paired substrates between which the liquid crystal layer is sandwiched and a λ/4 retardation layer (hereinafter, also referred to as an "in-cell retardation layer") is disposed on the liquid crystal layer side (back surface side) of the viewing surface side substrate. This configuration was found to be equal to a conventional transverse electric field mode liquid crystal display panel in the optical performance for incident light. However, a liquid crystal display panel having such a configuration, when employing a color filter substrate as the viewing surface side substrate, may unfortunately cause light leakage in an end region of the display region in the black display state.

The present inventors made various studies on the cause of the light leakage, and found the following mechanism. A typical color filter substrate includes a stack of a black matrix and a color filter layer in the display region, while including the black matrix in the frame region surrounding the display region (non-display region). The surface of the color filter layer in the display region is therefore positioned higher than the surface of the black matrix in the frame region, which produces a height difference between the two regions. A material of an overcoat layer is then applied to the display region and the frame region. The material, however, cannot flatten the surface with such a height difference between the two regions, and thus the resulting overcoat layer in the end region of the display region (periphery of the display region) is thinner than in the central region of the display region. To the surface of the overcoat layer is applied a material of an in-cell retardation layer. The material of an in-cell retardation layer has a flattening effect, giving a thicker in-cell retardation layer in the end region of the display region, where the overcoat layer is thinner, than in the central region of the display region. This results in different in-plane retardations of the in-cell retardation layer; the in-plane retardation may be optimal in the central region of the display region (in the region where the thickness of the in-cell retardation layer is constant), but the in-plane retardation in the end region of the display region may deviate significantly from the optimal value due to the large thickness of the in-cell retardation layer. The in-plane retardation provided by the in-cell retardation layer in the central region of the display region is therefore significantly different from that in the end region of the display region. This is why light leakage occurs in the end region of the display region in the black display state when the liquid crystal display panel is observed through the circular polarizer.

In contrast, when the thickness of the overcoat layer is thin in the end region of the display region in a configuration without an in-cell retardation layer (typical transverse electric field mode liquid crystal display panel), the thickness of the liquid crystal layer is correspondingly thick. The liquid crystal layer, in the black display state, behaves as an isotropic medium for light incident from the back surface side (for example, linearly polarized light), and therefore does not cause light leakage even when having a partially varying thickness. Hence, the light leakage in the end region of the display region is a phenomenon unique to the configuration including an in-cell retardation layer.

In response to the above issues, an object of the present invention is to provide a transverse electric field mode liquid crystal display panel with reduced light leakage in the end region of the display region, and a method for producing the liquid crystal display panel.

The present inventors made various studies on the transverse electric field mode liquid crystal display panel with reduced light leakage in the end region of the display region and the method for producing the liquid crystal display panel. The inventors then focused on use of an in-cell retardation layer formed by light irradiation followed by heating, which partially varies the light irradiation intensity. The studies found that use of such an in-cell retardation layer reduces the variation in the in-plane retardation even with an in-cell retardation layer having a thickness varying in the display region. This finding led to achievement of the above object, and thereby the inventors completed the present invention.

In other words, one aspect of the present invention may be a liquid crystal display panel including in the following order from a viewing surface side to a back surface side: a first polarizer; a first $\lambda/4$ retardation layer; a first substrate; a second $\lambda/4$ retardation layer; a liquid crystal layer; a second substrate; and a second polarizer, the liquid crystal display panel being in a transverse electric field mode, the first substrate including a color filter layer in a display region, the second $\lambda/4$ retardation layer being a single layer covering the color filter layer and including a first retardation portion in an end region of the display region and a second retardation portion in a central region of the display region, the first retardation portion having a greater thickness than the second retardation portion, and the first retardation portion and the second retardation portion differing from each other in in-plane retardation by 10 nm or less.

Another aspect of the present invention may be a method for producing a liquid crystal display panel, the liquid crystal display panel including in the following order from a viewing surface side to a back surface side: a first polarizer; a first $\lambda/4$ retardation layer; a first substrate; a second $\lambda/4$ retardation layer; a liquid crystal layer; a second substrate; and a second polarizer, the liquid crystal display panel being in a transverse electric field mode, the first substrate including a color filter layer in a display region, the method including: applying a coating liquid containing a photopolymerizable material to the first substrate to cover the color filter layer so as to form a single layer coating film that includes a first coating film portion being positioned in an end region of the display region and a second coating film portion being positioned in a central region of the display region and having a smaller thickness than the first coating film portion; irradiating the coating film with light at least once so as to form a cured product of the coating film; and heating the cured product of the coating film so as to form the second $\lambda/4$ retardation layer, the irradiating the coating film including irradiating the coating film with light such that a light irradiation intensity for the first coating film portion is lower than a light irradiation intensity for the second coating film portion.

The present invention can provide a transverse electric field mode liquid crystal display panel with reduced light leakage in the end region of the display region, and a method for producing the liquid crystal display panel.

DETAILED DESCRIPTION OF THE INVENTION

The present invention is described in more detail based on the following embodiment with reference to the drawings. The embodiment, however, is not intended to limit the scope of the present invention. The configurations of the embodiment may appropriately be combined or modified within the spirit of the present invention.

The expression "X to Y" as used herein means "X or more and Y or less".

Embodiment

Figure 1:
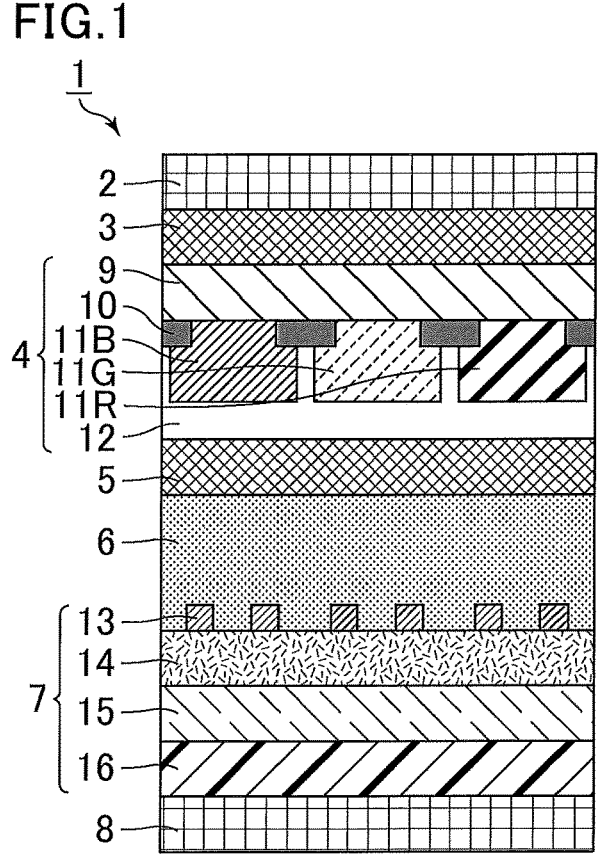
FIG. 1 is a schematic cross-sectional view of a liquid crystal display panel of an embodiment.

A liquid crystal display panel and a production method thereof according to an embodiment are described below.
(1) Liquid Crystal Display Panel The liquid crystal display panel of the embodiment is described below with reference to FIG. 1. FIG. 1 is a schematic cross-sectional view of the liquid crystal display panel of the embodiment.

A liquid crystal display panel 1 includes, in the following order from the viewing surface side to the back surface side, a first polarizer 2, a first $\lambda/4$ retardation layer (out-cell retardation layer) 3, a first substrate 4, a second $\lambda/4$ retardation layer (in-cell retardation layer) 5, a liquid crystal layer 6, a second substrate 7, and a second polarizer 8. The "viewing surface side" herein means the side closer to the screen (display surface) of the liquid crystal display panel; for example, the viewing surface side in FIG. 1 means the upper side (first polarizer 2 side) of the liquid crystal display panel 1. The "back surface side" means the side farther from the screen (display surface) of the liquid crystal display panel; for example, the back surface side in FIG. 1 means the lower side (second polarizer 8 side) of the liquid crystal display panel 1.

<First Polarizer and Second Polarizer>

The first polarizer 2 and the second polarizer 8 may be, for example, those obtained by dyeing a polyvinyl alcohol film with an unisotropic material such as an iodine complex (or dye) to adsorb the unisotropic material on the polyvinyl alcohol film, and stretching the film for alignment. A polarizer herein means a linear polarizer (absorptive polarizer), which is different from a circular polarizer.

The transmission axis of the first polarizer 2 and the transmission axis of the second polarizer 8 are preferably perpendicular to each other. The first polarizer 2 and the second polarizer 8 in this state are in crossed Nicols, which enables effective achievement of black display with no voltage applied to the liquid crystal layer 6 and grayscale display (e.g., intermediate grayscale display, white display) with voltage applied to the liquid crystal layer 6. The expression "two axes are perpendicular to each other" herein means that they form an angle of 87° to 93°, preferably 89° to 91°, more preferably 89.5° to 90.5°, particularly preferably 90° (perfect right angle).

<First λ/4 Retardation Layer>

The first λ/4 retardation layer 3 is a retardation layer that introduces an in-plane retardation of a quarter of a wavelength (λ/4), preferably an in-plane retardation of 100 to 176 nm, to incident light having a wavelength λ.

The in-plane retardation Re of the retardation layer as used herein is represented by Re=(ns−nf)×D, where ns is the larger of nx and ny, which are the main refractive indexes in the in-plane direction of the retardation layer, nf is the smaller of nx and ny, and D is the thickness of the retardation layer. For example, the in-plane retardation Re of a retardation layer formed of a liquid crystal material is represented by Re=Δn×D, where Δn is the refractive index anisotropy of the liquid crystal material.

The first λ/4 retardation layer 3 may be formed of, for example, a photopolymerizable material such as a photopolymerizable liquid crystal material. The photopolymerizable liquid crystal material may be, for example, a liquid crystal material whose liquid crystal molecules each have a photopolymerizable group such as an acrylate or methacrylate group at a terminal of its skeleton. The photopolymerizable liquid crystal material functions as the first λ/4 retardation layer 3 after sequentially undergoing light irradiation and heating. In this case, the first λ/4 retardation layer 3 may be stacked on a substrate such as a polyethylene terephthalate film, and the stack may be bonded to the surface remote from the liquid crystal layer 6 (viewing surface side) of the first substrate 4 with an adhesive, for example.

The first λ/4 retardation layer 3, which can be a layer as described above, can also be a stretched polymer film. The polymer film may be formed of, for example, a cycloolefin polymer, polycarbonate, polysulfone, polyether sulfone, polyethylene terephthalate, polyethylene, polyvinyl alcohol, norbornene, triacetyl cellulose, or diacetyl cellulose.

The in-plane slow axis of the first λ/4 retardation layer 3 and the transmission axis of the first polarizer 2 preferably form an angle of 45°. This enables a circular polarizer, which is a stack of the first polarizer 2 and the first λ/4 retardation layer 3, to be disposed on the viewing surface side of the liquid crystal display panel 1. The circular polarizer converts light (e.g., external light) incident thereon from the viewing surface side of the liquid crystal display panel 1 into circularly polarized light before the light reaches the first substrate 4. The circular polarizer therefore has an anti-reflection effect which reduces reflection from the first substrate 4 (layer more remote from the liquid crystal layer 6 (closer to the viewing surface side) than the overcoat layer 12), increasing the visibility in bright places. The expression that "two axes form an angle of 45°" herein means that they form an angle of 42° to 48°, preferably 44° to 46°, more preferably 44.5° to 45.5°, particularly preferably 45°.

<First Substrate>

The first substrate 4 includes a first supporting substrate 9, a black matrix 10 disposed on part of the liquid crystal layer 6 side (back surface side) surface of the first supporting substrate 9, color filter layers 11R (red), 11G (green), and 11B (blue), and an overcoat layer 12 covering the black matrix 10 and the color filter layers 11R, 11G, and 11B directly.

The first supporting substrate 9 may be, for example, a glass substrate or a plastic substrate.

The black matrix 10 may be formed of, for example, a black resist having a light-shielding ratio of 99.9% or higher (an OD value of 3.0 or higher).

The color filter layers 11R, 11G, and 11B may be formed of, for example, a pigment-dispersed color resist. The combination of colors for the color filter layers may also be any combination such as a combination of red, green, blue, and yellow, as well as the combination of red, green, and blue shown in FIG. 1.

The overcoat layer 12 may be formed of, for example, a transparent resin, particularly one having high heat resistance and high chemical resistance.

<Second λ/4 Retardation Layer>

The second λ/4 retardation layer 5 is a retardation layer that introduces an in-plane retardation of a quarter of a wavelength (λ/4), preferably an in-plane retardation of 100 to 176 nm, to incident light having a wavelength λ.

The second λ/4 retardation layer 5 may be formed of, for example, the same photopolymerizable material as that of the first λ/4 retardation layer 3. The photopolymerizable liquid crystal material functions as the second λ/4 retardation layer 5 after sequentially undergoing light irradiation and heating. The second λ/4 retardation layer 5 formed of a photopolymerizable liquid crystal material also functions as a flattening layer of the first substrate 4, thereby giving a uniform space (thickness of the liquid crystal layer 6: cell gap) between the second λ/4 retardation layer 5 (first substrate 4) and the second substrate 7.

The relationship between the second λ/4 retardation layer 5 and the first substrate 4 is described below.

Figure 2:
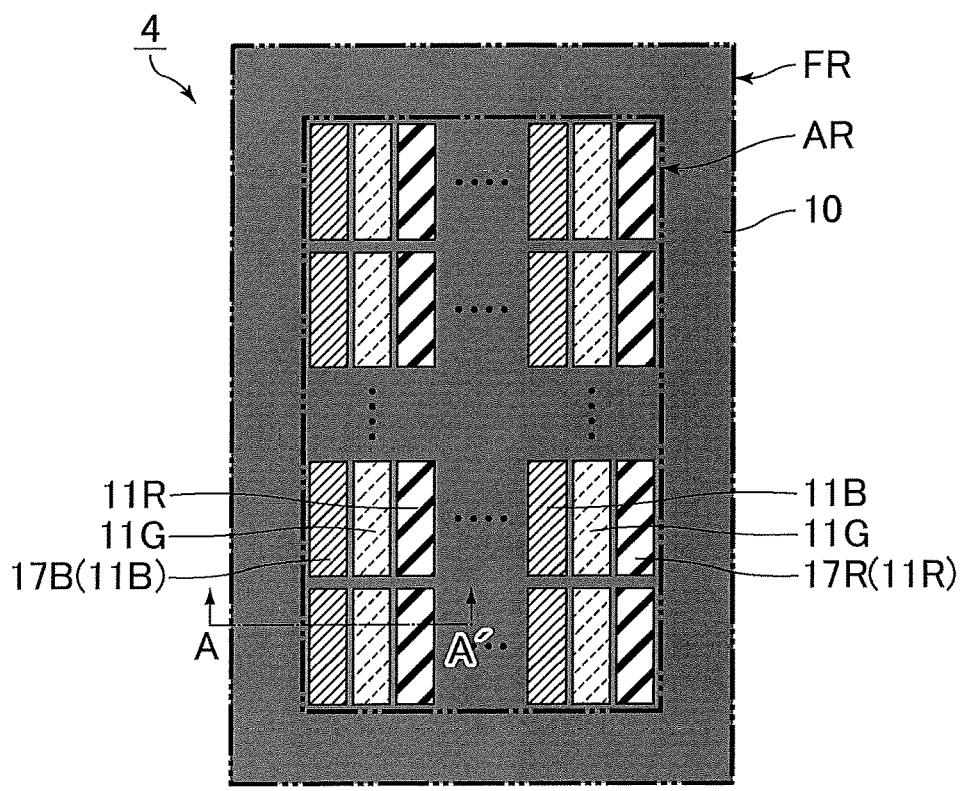
FIG. 2 is a schematic plan view of the liquid crystal display panel of the embodiment, showing a second $\lambda/4$ retardation layer and a first substrate as viewed from the liquid crystal layer side (back surface side).

FIG. 2 is a schematic plan view of the liquid crystal display panel of the embodiment, showing the second λ/4 retardation layer and the first substrate as viewed from the liquid crystal layer side (back surface side). As shown in FIG. 2, the first substrate 4 includes the color filter layers 11R, 11G, and 11B in the display region AR where image(s) or letter(s), for example, are displayed. A color filter layer positioned in an end region of the display region AR is referred to as an "edge color filter layer". In FIG. 2, an edge color filter layer 17B (blue: color filter layer 11B) is disposed in the left end region of the display region AR, while an edge color filter layer 17R (red: color filter layer 11R) is disposed in the right end region of the display region AR. The black matrix 10 is disposed in a grid pattern to define the color filter layers 11R, 11G, and 11B in the display region AR, and is disposed on the entire surface in a frame region (non-display region) FR surrounding the display region AR.

FIG. 2 does not show the overcoat layer 12 and the second λ/4 retardation layer 5 because these layers are transparent, but these layers are actually disposed on the entire surface in the display region AR and the frame region FR.

Figure 3:
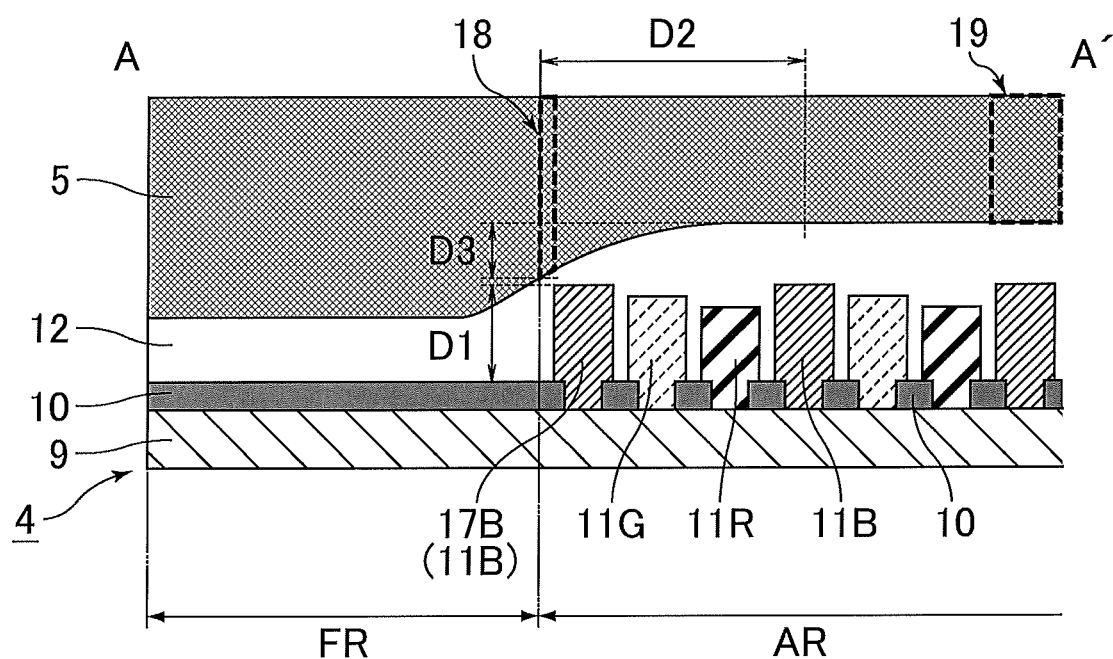
FIG. 3 is a schematic cross-sectional view of a portion corresponding to the line A-A' in FIG. 2.

FIG. 3 is a schematic cross-sectional view of a portion corresponding to the line A-A' in FIG. 2. In FIG. 3, the lower side corresponds to the viewing surface side (the side remote from the liquid crystal layer 6), while the upper side corresponds to the back surface side (the side close to the liquid crystal layer 6). As shown in FIG. 3, the overcoat layer 12 in the first substrate 4 covers the black matrix 10 and the color filter layers 11R, 11G, and 11B (17B) directly in the display region AR, while covering the black matrix 10 directly in the frame region FR.

The second λ/4 retardation layer 5 is a single layer (is jointless) and includes a first retardation portion 18 in an end region of the display region AR and a second retardation portion 19 in a central region of the display region AR. The second λ/4 retardation layer 5 covers the overcoat layer 12 directly in the display region AR and the frame region FR. In other words, the second λ/4 retardation layer 5 covers, with the overcoat layer 12 in between, the color filter layers 11R, 11G, and 11B (17B) in the display region AR and covers the black matrix 10 in the frame region FR.

The surface of the edge color filter layer 17B in the display region AR is positioned higher than the surface of the black matrix 10 in the frame region FR, which produces a height difference D1 between them. The overcoat layer 12 therefore has a smaller thickness in a region from the end region of the display region AR to the point which is a distance D2 away from the end region than in the central region of the display region AR by at most a difference D3. The thickness of the overcoat layer 12 is the distance from the surface of a color filter layer having the largest thickness (the color filter layer 11B in FIG. 3) among the color filter layers 11R, 11G, and 11B to the surface of the overcoat layer 12. In summary, the second λ/4 retardation layer 5 has a greater thickness in the region from the end region of the display region AR to the point which is the distance D2 away from the end region than in the central region of the display region AR by at most the difference D3. In other words, in the second λ/4 retardation layer 5, the first retardation portion 18 has a greater thickness than the second retardation portion 19 by the difference D3.

In the second λ/4 retardation layer 5, the first retardation portion 18 and the second retardation portion 19 differ from each other in in-plane retardation by 10 nm or less, preferably 6 nm or less, more preferably 5 nm or less, particularly preferably 0 nm (they are completely the same). This reduces light leakage in the end region of the display region AR in the black display state even when the first retardation portion 18 has a greater thickness than the second retardation portion 19.

In the second λ/4 retardation layer 5, the difference (change in thickness of the second λ/4 retardation layer 5) D3 between the thickness of the first retardation portion 18 and the thickness of the second retardation portion 19 may be 0.08 μm or more. This reduces light leakage in the end region of the display region AR in the black display state even when the first retardation portion 18 has a significantly greater thickness than the second retardation portion 19.

The relationship between the second λ/4 retardation layer 5 and the first substrate 4 was described above, with a focus on the left end region of the liquid crystal display panel 1. The same applies to the right end region, upper end region, and lower end region of the liquid crystal display panel 1, except that the types (e.g., colors, thicknesses) of the edge color filter layers are different at different positions.

The in-plane slow axis of the second λ/4 retardation layer 5 and the in-plane slow axis of the first λ/4 retardation layer 3 are preferably perpendicular to each other. This structure enables the first λ/4 retardation layer 3 and the second λ/4 retardation layer 5 to cancel out each other's in-plane retardations to be introduced to light incident from the back surface side of the liquid crystal display panel 1 (e.g., light incident from the backlight), achieving a state where, optically, these layers do not exist. In other words, the structure makes the liquid crystal display panel 1 optically equivalent to a conventional transverse electric field mode liquid crystal display panel in behavior for light incident from the back surface side of the liquid crystal display panel 1. This can achieve display in a transverse electric field mode using a circular polarizer. The first λ/4 retardation layer 3 and the second λ/4 retardation layer 5 are preferably formed of the same material. This enables the first λ/4 retardation layer 3 and the second λ/4 retardation layer 5 to cancel out each other's in-plane retardation including chromatic dispersion.

Between the first substrate 4 and the second λ/4 retardation layer 5 may be disposed an alignment film for the second λ/4 retardation layer 5. Such an alignment film can align a cured product of a photopolymerizable liquid crystal material when the second λ/4 retardation layer 5 is formed of the photopolymerizable liquid crystal material, so that the cured product can effectively function as the second λ/4 retardation layer 5. The alignment film may be formed of, for example, an organic material such as a polyimide or a photoisomerizable photoalignment material. The surface of the alignment film may be subjected to an alignment treatment such as a photoalignment treatment or a rubbing treatment.

Between the second λ/4 retardation layer 5 and the liquid crystal layer 6 may be disposed a horizontal alignment film for the liquid crystal layer 6. The horizontal alignment film has a function of aligning nearby liquid crystal molecules in the direction parallel to the surface thereof. The state where liquid crystal molecules are aligned in the direction parallel to the surface of the horizontal alignment film means that the pre-tilt angle (angle of inclination when no voltage is applied) of the liquid crystal molecules is 0° to 5° from the surface of the horizontal alignment film. The horizontal alignment film may be formed of, for example, an organic material such as a polyimide or a photoisomerizable photoalignment material. The surface of the horizontal alignment film may be subjected to an alignment treatment such as a photoalignment treatment or a rubbing treatment.

On the liquid crystal layer 6 side (back surface side) surface of the second λ/4 retardation layer 5 may be disposed photo spacers. The photo spacers effectively maintain the space between the second λ/4 retardation layer 5 (first substrate 4) and the second substrate 7 (thickness of the liquid crystal layer 6: cell gap). The photo spacers are preferably superimposed on the black matrix 10 in a plan view. The photo spacers in this case are hidden by the black matrix 10 as viewed from the viewing surface side of the liquid crystal display panel 1, making the photo spacers invisible.

<Second Substrate>

The second substrate 7 includes a second supporting substrate 16, a common electrode 15 on the liquid crystal layer 6 side (viewing surface side) surface of the second supporting substrate 16, an insulating film 14 covering the common electrode 15, and pixel electrodes 13 on the liquid crystal layer 6 side (viewing surface side) surface of the insulating film 14. This structure generates transverse electric fields (fringe electric fields) in the liquid crystal layer 6 when voltage is applied between the pixel electrodes 13 and the common electrode 15 (with voltage applied), thereby controlling the alignment of liquid crystal molecules in the liquid crystal layer 6. In other words, the liquid crystal display panel 1 is a transverse electric field mode liquid crystal display panel.

The second supporting substrate 16 may be, for example, a glass substrate or a plastic substrate.

The common electrode 15 is a planar electrode. The liquid crystal display panel 1 in this structure applies the same voltage to each pixel.

The common electrode 15 may be formed of, for example, a transparent material (inorganic material) such as indium tin oxide (ITO) or indium zinc oxide (IZO).

The insulating film 14 can be formed of either an organic insulating material or an inorganic insulating material. Examples of the organic insulating material include polyimides. Examples of the inorganic insulating material include nitrides.

The pixel electrodes 13 are each provided with slits. Such pixel electrodes efficiently generate transverse electric fields (fringe electric fields) with the common electrode 15 with voltage applied.

The pixel electrodes 13 may be formed of, for example, a transparent material (inorganic material) such as indium tin oxide (ITO) or indium zinc oxide (IZO).

FIG. 1 shows the case where the liquid crystal display panel 1 is an FFS mode liquid crystal display panel (the second substrate 7 is an FFS mode thin-film transistor array substrate). The liquid crystal display panel 1, however, may be in the IPS mode, which is also a transverse electric field mode. In an IPS mode liquid crystal display panel, transverse electric fields are generated in the liquid crystal layer 6 when voltage is applied between paired comb electrodes disposed on the second substrate 7 (with voltage applied), so that the alignment of liquid crystal molecules in the liquid crystal layer 6 is controlled.

Between the second substrate 7 and the liquid crystal layer 6 may be disposed a horizontal alignment film for the liquid crystal layer 6.

<Liquid Crystal Layer>

Liquid crystal molecules in the liquid crystal layer 6 are homogeneously aligned when no voltage is applied to the liquid crystal layer 6. The homogeneous alignment of the liquid crystal molecules means that the pre-tilt angle (inclination angle with no voltage applied) of the liquid crystal molecules is 0° to 5° from the surface of the second substrate 7.

Specifically, the liquid crystal molecules are aligned in the direction parallel to the transmission axis of the first polarizer 2 or the transmission axis of the second polarizer 8 with no voltage applied to the liquid crystal layer 6. The liquid crystal molecules being aligned in the direction parallel to the transmission axis of the first polarizer 2 or the transmission axis of the second polarizer 8 means that the major axis (optical axis) of each liquid crystal molecule projected on the surface of the first polarizer 2 or the second polarizer 8 and the transmission axis of the first polarizer 2 or the transmission axis of the second polarizer 8 form an angle of 0° to 3°, preferably 0° to 1°, more preferably 0° to 0.5°, particularly preferably 0° (they are perfectly parallel).

When voltage is applied to the liquid crystal layer 6, the liquid crystal molecules are aligned by the transverse electric fields generated in the liquid crystal layer 6.

The liquid crystal layer 6 may be formed of, for example, a negative liquid crystal material having negative anisotropy of dielectric constant (Δε<0).

On the back surface side of the liquid crystal display panel 1 (second polarizer 8) may be disposed a backlight. This achieves a transmissive liquid crystal display device. The backlight can be a conventionally known one. The backlight can be of any type such as an edge-lit backlight or a direct-lit backlight. The backlight may include any light source such as a light emitting diode (LED) or a cold cathode fluorescent lamp (CCFL).

(2) Method for Producing Liquid Crystal Display Panel

The method for producing a liquid crystal display panel according to the embodiment is exemplified below.

Production Method Example 1

Figure 4:
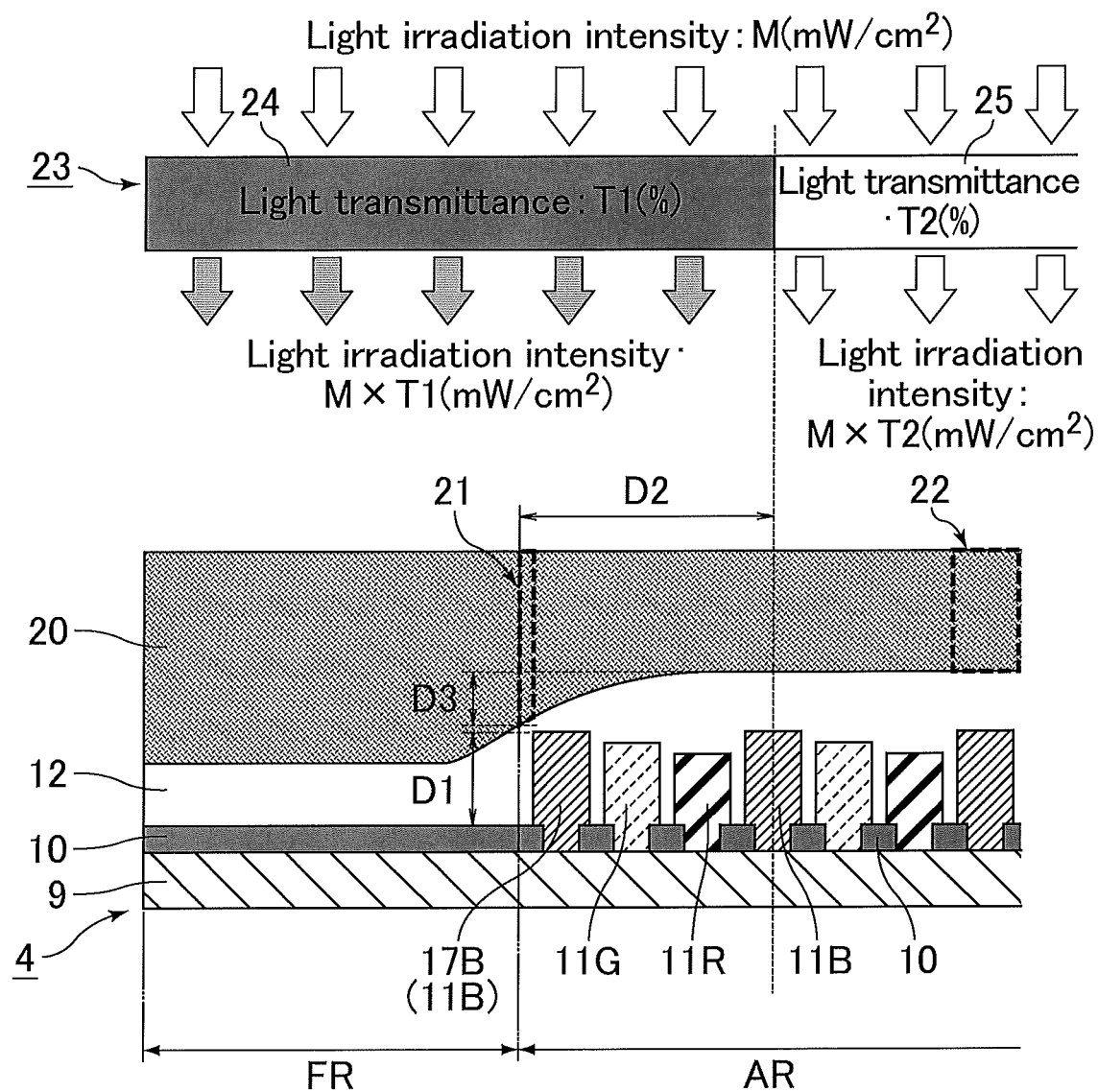
FIG. 4 is a schematic cross-sectional view for describing Production Method Example 1 for the liquid crystal display panel of the embodiment.

Production Method Example 1 is described below with reference to FIG. 4 as well as FIGS. 1 to 3. FIG. 4 is a schematic cross-sectional view for describing Production Method Example 1 for the liquid crystal display panel of the embodiment.

<Formation of Alignment Film for Second λ/4 Retardation Layer>

An alignment material (for example, organic material such as a polyimide or a photoisomerizable photoalignment material) is applied to a surface of the first substrate 4, so that a film of the alignment material is formed. This film of the alignment material is pre-baked and post-baked, whereby an alignment film (not illustrated) for the second λ/4 retardation layer 5 is formed. The surface of the alignment film for the second λ/4 retardation layer 5 may be subjected to an alignment treatment such as a photoalignment treatment or a rubbing treatment.

<Formation of Second λ/4 Retardation Layer: Application>

A coating liquid is prepared by appropriately dissolving a photopolymerizable material (for example, photopolymerizable liquid crystal material) in an organic solvent such as propylene glycol monomethyl ether acetate. The coating liquid, containing the photopolymerizable material, is applied to the first substrate 4 to cover the color filter layers 11R, 11G, and 11B (technically the alignment film for the second λ/4 retardation layer 5), and thereby a single layer coating film 20 as shown in FIG. 4 is formed. The coating film 20 includes a first coating film portion 21 being positioned in an end region of the display region AR and a second coating film portion 22 being positioned in a central region of the display region AR and having a smaller thickness than the first coating film portion 21. The coating film 20 may be subjected to pre-baking for drying the organic solvent before the light irradiation described below.

<Formation of Second λ/4 Retardation Layer: Light Irradiation>

As shown in FIG. 4, irradiating the coating film 20 with light (e.g., ultraviolet rays) through a photomask 23 once gives a cured product of the coating film 20. The coating film 20 is irradiated with light such that the light irradiation intensity for the first coating film portion 21, which is thicker than the second coating film portion 22, is lower than the light irradiation intensity for the second coating film portion 22. For achievement of this state, the present production method example employs the following halftone mask as the photomask 23.

The photomask 23 includes a first mask portion 24 corresponding to the frame region FR and a region from the end region of the display region AR to the point which is the distance D2 away from the end region, and a second mask portion 25 corresponding to the other regions including the central region of the display region AR. In other words, in the photomask 23, the first mask portion 24 corresponds to the position of the first coating film portion 21, and the second mask portion 25 corresponds to the position of the second coating film portion 22. The first mask portion 24 has a lower light transmittance than the second mask portion 25.

The light irradiation in the present production method example can therefore irradiate the coating film 20 with light such that the light irradiation intensity for the first coating film portion 21 is lower than the light irradiation intensity for the second coating film portion 22. Specifically, the coating film 20 is irradiated with light from a light source with a light irradiation intensity of M (mW/cm$^2$) through the photomask 23 whose first mask portion 24 has a light transmittance of T1(%) and whose second mask portion 25 has a light transmittance of T2(%) (T1<T2). This makes the light irradiation intensity M×T1 (mW/cm$^2$) for the first coating film portion 21 lower than the light irradiation intensity M×T2 (mW/cm$^2$) for the second coating film portion 22.

<Formation of Second λ/4 Retardation Layer: Heating>

The cured product of the coating film 20 is heated (post-baked) to form the second λ/4 retardation layer 5 as shown in FIG. 3.

<Formation of Photo Spacer>

A photoresist is applied to the surface remote from the first substrate 4 of the second λ/4 retardation layer 5. The applied photoresist is patterned by photolithography and baked (heated), whereby photo spacers (not illustrated) are formed.

<Formation of Alignment Film for Liquid Crystal Layer>

An alignment material (for example, organic material such as a polyimide or a photoisomerizable photoalignment material) is applied to the surface remote from the first substrate 4 of the second λ/4 retardation layer 5 (with photo spacers) to form a film of the alignment material. The film of the alignment material is pre-baked and post-baked, so that an alignment film (not illustrated) for the liquid crystal layer 6 is formed. The surface of the alignment film for the liquid crystal layer 6 may be subjected to an alignment treatment such as a photoalignment treatment or a rubbing treatment.

<Completion of Liquid Crystal Display Panel>

The first substrate 4 on which layers including the second λ/4 retardation layer 5 are stacked and the second substrate 7 are bonded to each other with the liquid crystal layer 6 being sandwiched in between, followed by stacking the first polarizer 2, the first λ/4 retardation layer 3, and the second polarizer 8 on the bonded product. Thereby, the liquid crystal display panel 1 as shown in FIG. 1 is completed.

The present production method example includes, during or after the formation of the second λ/4 retardation layer 5, heating at high temperatures, such as post-baking of the cured product of the coating film 20, formation (baking) of the photo spacers, and formation (pre-baking and post-baking) of the alignment film for the liquid crystal layer 6. These heating processes can sometimes weaken the in-plane retardation of the second λ/4 retardation layer 5. The light irradiation in formation of the second λ/4 retardation layer 5 in the present production method example therefore includes irradiating the coating film 20 with light such that the light irradiation intensity for the first coating film portion 21 is lower than the light irradiation intensity for the second coating film portion 22. This can achieve in the cured product of the coating film 20 (second λ/4 retardation layer 5), which is a single layer, a state where the heat resistance of the cured product of the first coating film portion 21 (first retardation portion 18) is lower than the heat resistance of the cured product of the second coating film portion 22 (second retardation portion 19), i.e., a state where the in-plane retardation of the cured product of the first coating film portion 21 (first retardation portion 18) tends to be lower than the in-plane retardation of the cured product of the second coating film portion 22 (second retardation portion 19), through the processes involving heating.

The cured product of the first coating film portion 21 (first retardation portion 18) can therefore have a larger thickness than the cured product of the second coating film portion 22 (second retardation portion 19), i.e., the cured product of the first coating film portion 21 (first retardation portion 18) can have a greater in-plane retardation than the cured product of the second coating film portion 22 (second retardation portion 19), immediately after the light irradiation in formation of the second λ/4 retardation layer 5. Even in such a state, the present production method example can maintain the difference in in-plane retardation between the first coating film portion 21 and the second coating film portion 22 to 10 nm or less after at least one of the processes involving heating, owing to the different heat resistances of the coating film portions. Thereby, the liquid crystal display panel 1 can reduce light leakage in the end region of the display region AR in the black display state.

Production Method Example 2

Figure 5:
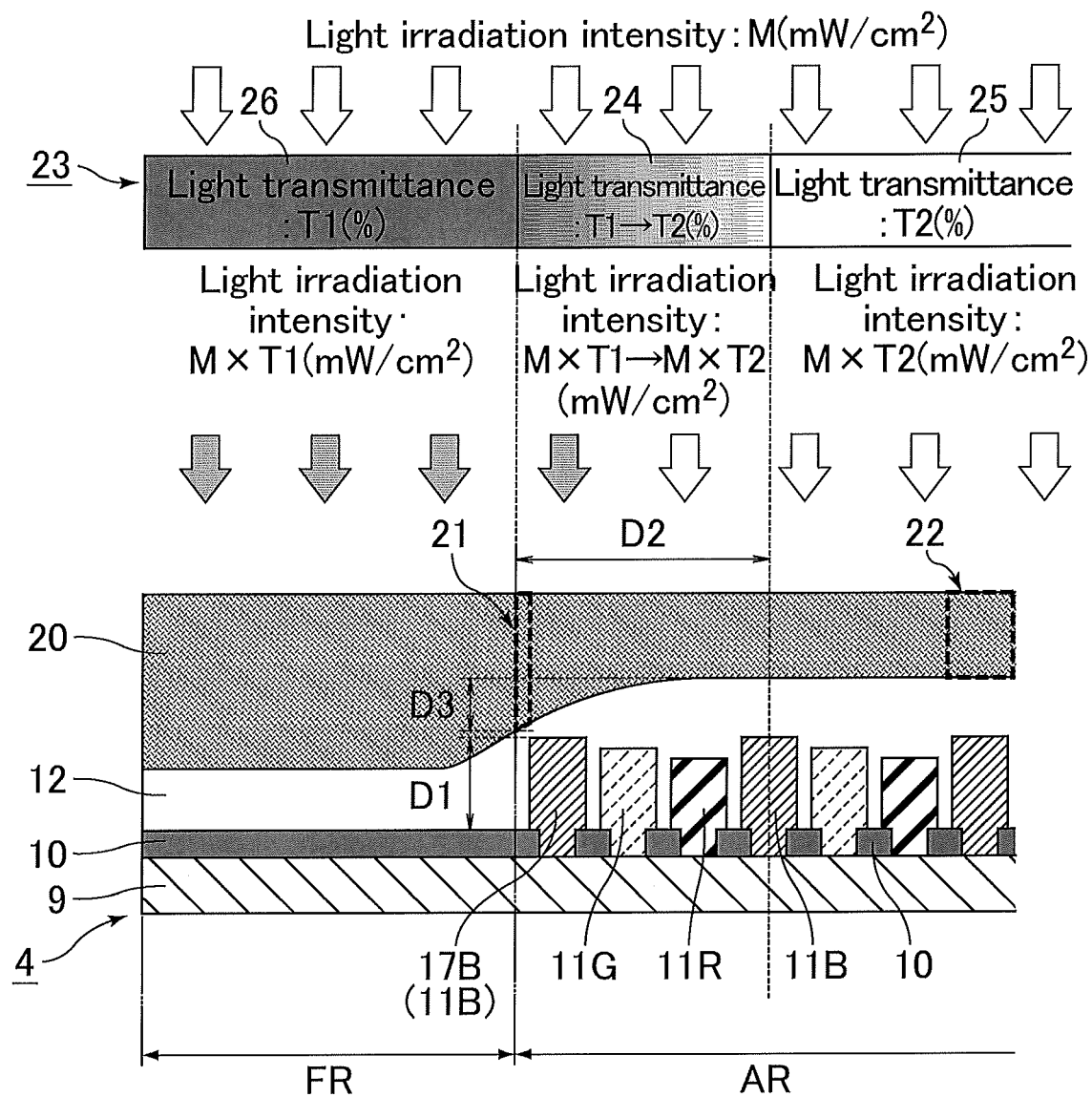
FIG. 5 is a schematic cross-sectional view for describing Production Method Example 2 for the liquid crystal display panel of the embodiment.

Production Method Example 2 is described below with reference to FIG. 5 as well as FIGS. 1 to 3. FIG. 5 is a schematic cross-sectional view for describing Production Method Example 2 for the liquid crystal display panel of the embodiment. Production Method Example 2 is the same as Production Method Example 1 except for the light irradiation in formation of the second λ/4 retardation layer. Hence, the same points will not be described here.

<Formation of Second λ/4 Retardation Layer: Light Irradiation>

As shown in FIG. 5, irradiating the coating film 20 with light (e.g., ultraviolet rays) through the photomask 23 once gives a cured product of the coating film 20. The coating film 20 is irradiated with light such that the light irradiation intensity for the first coating film portion 21, which is thicker than the second coating film portion 22, is lower than the light irradiation intensity for the second coating film portion 22. For achievement of this state, the present production method example employs the following gradation mask as the photomask 23.

The photomask 23 includes a third mask portion 26 corresponding to the frame region FR as well as the first mask portion 24 corresponding to a region from the end region of the display region AR to the point which is the distance D2 away from the end region and the second mask portion 25 corresponding to the other regions including the central region of the display region AR. In other words, in the photomask 23, the first mask portion 24 corresponds to the position of the first coating film portion 21, and the second mask portion 25 corresponds to the position of the second coating film portion 22. The third mask portion 26 has a lower light transmittance than the second mask portion 25. The first mask portion 24 has a light transmittance that falls between the light transmittance of the third mask portion 26 and the light transmittance of the second mask portion 25 and linearly increases from the third mask portion 26 side toward the second mask portion 25 side. In the region from the end region of the display region AR to the point which is the distance D2 away from the end region, the coating film 20 has a continuously varying thickness. The first mask portion 24 of the photomask 23 in the present production method example has a continuously varying light transmittance in response to the continuously varying thickness of the coating film 20. This configuration is more effective than that in Production Method Example 1 in terms of light leakage reduction.

The light irradiation in the present production method example can therefore irradiate the coating film 20 with light such that the light irradiation intensity for the first coating film portion 21 is lower than the light irradiation intensity for the second coating film portion 22. Specifically, the coating film 20 is irradiated with light from a light source with a light irradiation intensity M (mW/cm$^2$) through the photomask 23 whose third mask portion 26 has a light transmittance of T1(%), whose first mask portion 24 has a light transmittance increasing linearly from T1(%) to T2(%) (denoted as "T1→T2(%)" in FIG. 5) from the third mask portion 26 side toward the second mask portion 25 side, and whose second mask portion 25 has a light transmittance of T2(%) (T1<T2).

This makes the light irradiation intensity M×T1 (mW/cm$^2$) for the first coating film portion 21 lower than the light irradiation intensity M×T2 (mW/cm$^2$) for the second coating film portion 22.

The present production method example also clearly achieves the same effect as Production Method Example 1.

Production Method Example 3

Production Method Example 3 is described below with reference to FIG. 6 as well as FIGS. 1 to 3. FIG. 6 are schematic cross-sectional views for describing Production Method Example 3 for the liquid crystal display panel of the embodiment. Production Method Example 3 is the same as Production Method Example 1 except for the light irradiation in formation of the second λ/4 retardation layer. Hence, the same points will not be described here.

<Formation of Second λ/4 Retardation Layer: Light Irradiation>

As shown in FIG. 6, irradiating the coating film 20 with light (e.g., ultraviolet rays) twice gives a cured product of the coating film 20. The coating film 20 is irradiated with light such that the light irradiation intensity for the first coating film portion 21, which is thicker than the second coating film portion 22, is lower than the light irradiation intensity for the second coating film portion 22. For achievement of this state, the light irradiation for the coating film 20 in the present production method example is divided into two processes as described below. In the case of irradiating the coating film 20 with light a plurality of times as in the present production method example, the light irradiation intensity for the first coating film portion 21 and the light irradiation intensity for the second coating film portion 22 each mean the total light irradiation intensity during the plurality of times of light irradiation (the sum of the light irradiation intensities throughout the light irradiation processes).

Figure 6A:
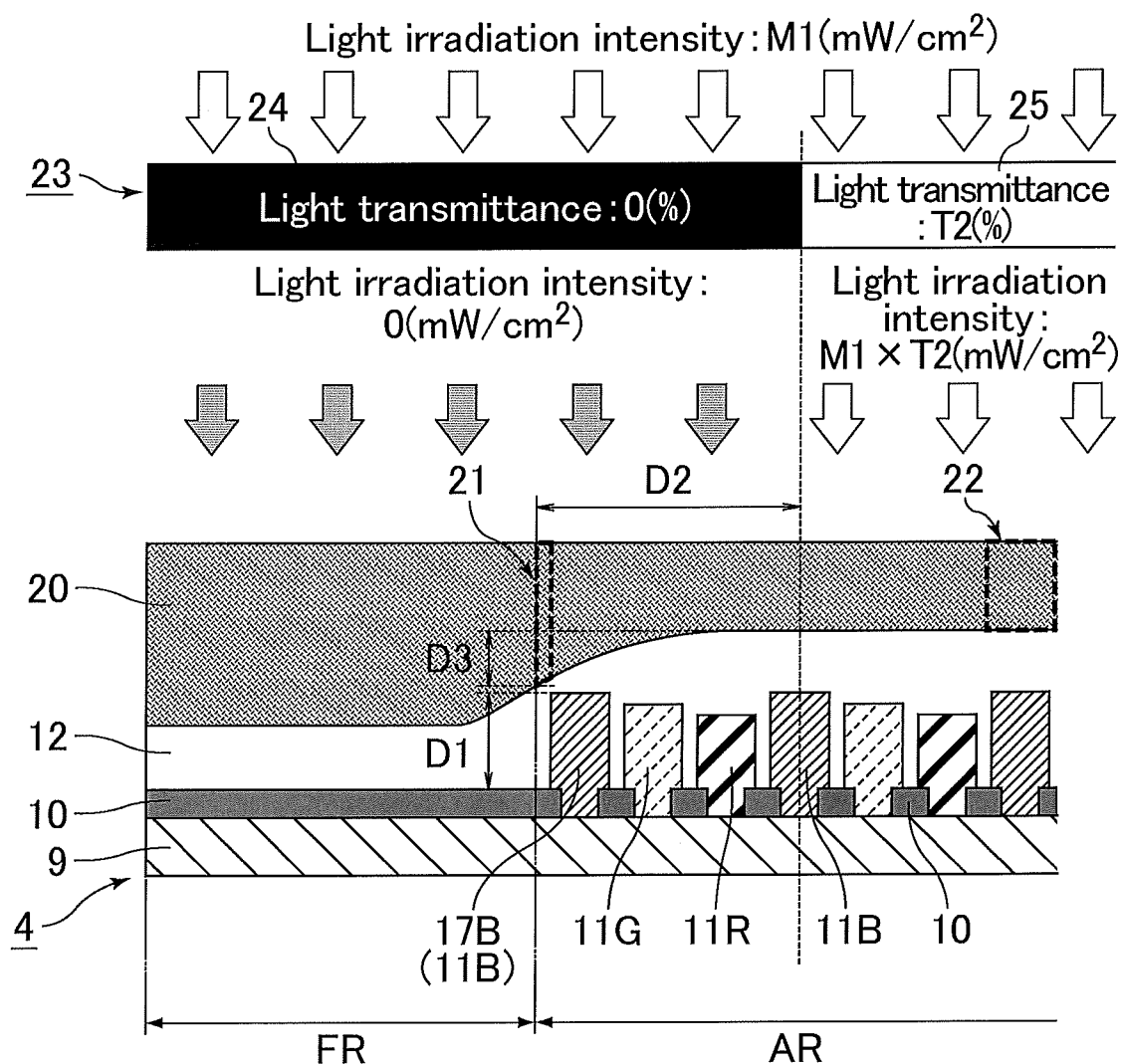
FIGS. 6A and 6B are schematic cross-sectional views for describing Production Method Example 3 for the liquid crystal display panel of the embodiment.

First, as shown in FIG. 6A, first light irradiation for the coating film 20 is performed through the photomask 23. The photomask 23 includes the first mask portion 24 corresponding to the frame region FR and a region from the end region of the display region AR to the point which is the distance D2 away from the end region, and the second mask portion 25 corresponding to the other regions including the central region of the display region AR. In other words, in the photomask 23, the first mask portion 24 corresponds to the position of the first coating film portion 21, and the second mask portion 25 corresponds to the position of the second coating film portion 22. The first mask portion 24 has a light transmittance of 0%, and the second mask portion 25 has a light transmittance of 90% or higher.

Figure 6B:
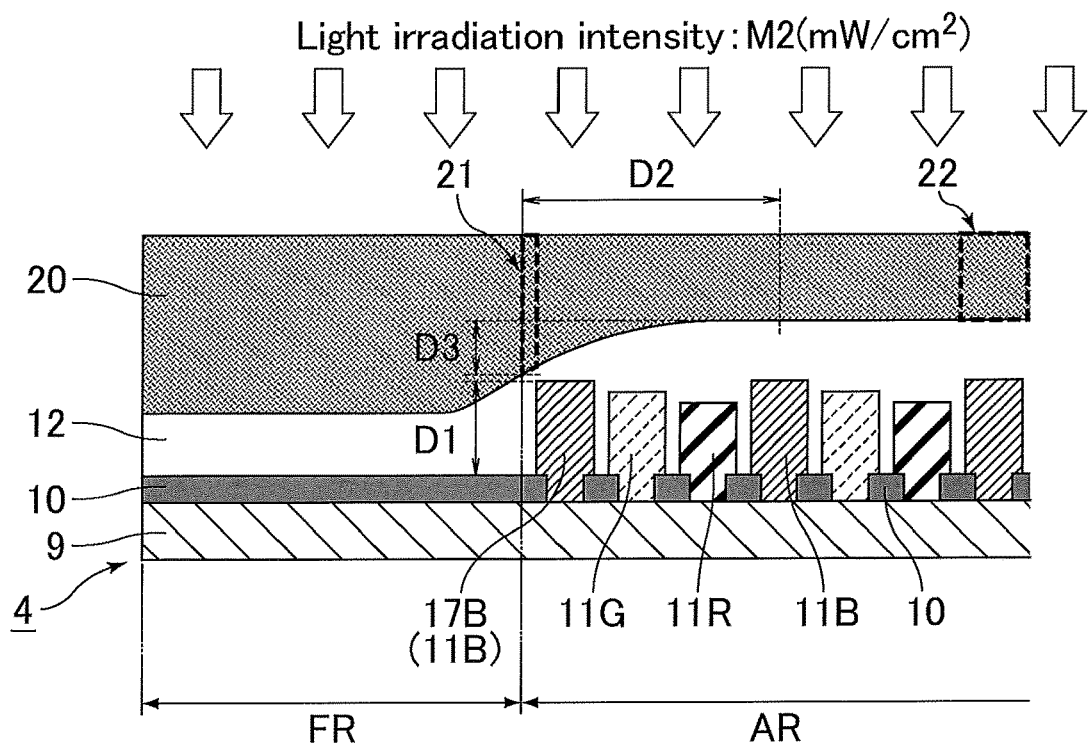

Next, as shown in FIG. 6B, second light irradiation for the coating film 20 is performed without any photomask. The first irradiation and the second irradiation use light sources having different light irradiation intensities.

The light irradiation in the present production method example therefore irradiates the coating film 20 with light such that the light irradiation intensity for the first coating film portion 21 is lower than the light irradiation intensity for the second coating film portion 22. Specifically, the first irradiation for the coating film 20 is performed using a light source with a light irradiation intensity M1 (mW/cm$^2$) through the photomask 23 whose first mask portion 24 has a light transmittance of 0% and whose second mask portion 25 has a light transmittance of T2(%) (T2≥90). The second irradiation for the coating film 20 is performed using a light source with a light irradiation intensity M2 (mW/cm$^2$) (M1≠M2) without any photomask. These irradiation processes make the light irradiation intensity M2 (mW/cm$^2$) for the first coating film portion 21 lower than the light irradiation intensity M1×T2+M2 (mW/cm$^2$) for the second coating film portion 22.

The present production method example can clearly achieve the same effect as Production Method Example 1. Also, since the second irradiation is performed without any photomask in the present production method example, the light irradiation dose for the region from the end region of the display region AR to the point which is the distance D2 away from the end region can be increased as in the other regions in the display region AR. Thereby, the amount of an uncured photopolymerizable material (for example, photopolymerizable liquid crystal material) decreases in the resulting second λ/4 retardation layer 5, so that the reliability of the liquid crystal display panel 1 increases.

EXAMPLES AND COMPARATIVE EXAMPLES

The present invention is described in more detail below based on examples and comparative examples. The examples, however, are not intended to limit the scope of the present invention.

In the examples and comparative examples, the in-plane retardations of the first λ/4 retardation layer and the second λ/4 retardation layer are values for light having a wavelength of 550 nm. Light having a wavelength of 550 nm is light to which the human eye is most sensitive. Also, the azimuth of the transmission axis of the first polarizer, the azimuth of the in-plane slow axis of the first λ/4 retardation layer, the azimuth of the in-plane slow axis of the second λ/4 retardation layer, the alignment direction of the liquid crystal molecules, and the azimuth of the transmission axis of the second polarizer are defined to be positive (+) in the counterclockwise direction from the reference line (0°) which is the longitudinal direction of the liquid crystal display panel.

Example 1

A liquid crystal display panel of Example 1 was the liquid crystal display panel of the embodiment produced by the method in Production Method Example 1.

<Formation of Alignment Film for Second λ/4 Retardation Layer>

A photoisomerizable photoalignment material was applied to a surface of the first substrate 4 to form a film of the photoalignment material. This film of the photoalignment material was pre-baked at 60° C. for 80 seconds, and then irradiated with polarized ultraviolet rays (irradiation dose at a wavelength of 365 nm: 100 mJ/cm$^2$), followed by post-baking at 230° C. for 30 minutes. Thereby, the alignment film for the second λ/4 retardation layer 5 was formed.

<Formation of Second λ/4 Retardation Layer: Application>

A photopolymerizable liquid crystal material (whose liquid crystal molecules have an acrylate group at a terminal of their skeleton; refractive index anisotropy Δn: 0.1657) was dissolved in propylene glycol monomethyl ether acetate (organic solvent), so that a coating liquid was prepared. The coating liquid was applied to the first substrate 4 to cover the color filter layers 11R, 11G, and 11B (technically the alignment film for the second λ/4 retardation layer 5) by slit coating, and thereby a single layer coating film 20 was formed. The coating film 20 was then pre-baked at 90° C. for 80 seconds.

<Formation of Second λ/4 Retardation Layer: Light Irradiation>

The coating film 20 was irradiated with ultraviolet rays through the photomask 23 once, so that a cured product of the coating film 20 was formed.

The ultraviolet ray irradiation intensity M of the light source at a wavelength of 365 nm was 33 mW/cm$^2$. In the photomask 23, the first mask portion 24 had an ultraviolet ray transmittance T1 of 10%, and the second mask portion 25 had an ultraviolet ray transmittance T2 of 90%. This made the ultraviolet ray irradiation intensity M×T1 for the first coating film portion 21, which was 3.3 mW/cm$^2$, lower than the ultraviolet ray irradiation intensity M×T2 for the second coating film portion 22, which was 29.7 mW/cm$^2$. Also, since the ultraviolet ray irradiation was performed such that the ultraviolet ray irradiation dose for the second coating film portion 22 was 200 mJ/cm$^2$, the ultraviolet ray irradiation dose for the first coating film portion 21 was 22.2 mJ/cm$^2$.

The surface of the edge color filter layer 17B in the display region AR was positioned higher than the surface of the black matrix 10 in the frame region FR, which produced a height difference D1 between the two regions of 1.6 μm. Thereby, the overcoat layer 12 had a thickness that was smaller in the region from the end region of the display region AR to the point which was the distance D2 (0.1 mm) away from the end region than the central region in the display region AR by at most the difference D3 (0.1 μm). Hence, the cured product of the coating film 20 had a greater thickness in the region from the end region of the display region AR to the point which was the distance D2 (0.1 mm) away from the end region than in the central region in the display region AR by at most the difference D3 (0.1 μm). In other words, in the cured product of the coating film 20, the cured product of the first coating film portion 21 in the end region of the display region AR had a greater thickness than the cured product of the second coating film portion 22 in the central region in the display region AR, which was 1.05 μm, by the difference D3 (0.1 μm), i.e., the cured product of the first coating film portion 21 in the end region of the display region AR had a thickness of 1.15 μm.

<Formation of Second λ/4 Retardation Layer: Heating>

The cured product of the coating film 20 was post-baked at 230° C. for 30 minutes, so that the second λ/4 retardation layer 5 was formed. The second λ/4 retardation layer 5 had its in-plane slow axis at an azimuth of 45°.

The second λ/4 retardation layer 5 had a greater thickness in the region from the end region of the display region AR to the point which was the distance D2 (0.1 mm) away from the end region than the central region of the display region AR by at most the difference D3 (0.1 μm). In other words, in the second λ/4 retardation layer 5, the first retardation portion 18 was positioned in the end region of the display region AR and had a greater thickness than the second retardation portion 19 being positioned in the central region of the display region AR, which had a thickness of 1.05 μm, by the difference D3 (0.1 μm), i.e., the first retardation portion 18 had a thickness of 1.15 μm.

<Formation of Photo Spacer>

A photoresist was applied to the surface remote from the first substrate 4 of the second λ/4 retardation layer 5. The applied photoresist was patterned by photolithography and baked at 230° C. for 30 minutes, whereby photo spacers were formed.

<Formation of Alignment Film for Liquid Crystal Layer>

A photoisomerizable photoalignment material was applied to the surface remote from the first substrate 4 of the second λ/4 retardation layer 5 (with photo spacers) to form a film of the photoalignment material. The film of the photoalignment material was pre-baked at 90° C. for 80 seconds, irradiated with polarized ultraviolet rays (irradiation dose at a wavelength of 365 nm: 5 J/cm$^2$), followed by post-baking at 220° C. for 35 minutes. Thereby, an alignment film for the liquid crystal layer 6 was formed.

<Completion of Liquid Crystal Display Panel>

The first substrate 4 on which layers including the second λ/4 retardation layer 5 were stacked and the second substrate 7 were bonded to each other with the liquid crystal layer 6 being sandwiched in between, followed by stacking the first polarizer 2, the first λ/4 retardation layer 3, and the second polarizer 8 on the bonded product. Thereby, the liquid crystal display panel of Example 1 was completed.

The members included in the liquid crystal display panel of Example 1 other than the second λ/4 retardation layer 5 were as follows.

<First Polarizer>

The first polarizer 2 used was one (absorptive polarizer) obtained by dyeing a polyvinyl alcohol film with an iodine complex (or dye) to adsorb the iodine complex on the polyvinyl alcohol film, and stretching the film for alignment. The first polarizer 2 had its transmission axis at an azimuth of 0°.

<First λ/4 Retardation Layer>

The first λ/4 retardation layer 3 used was one formed by the following method. A photoisomerizable photoalignment material was applied to the surface of a polyethylene terephthalate film by slit coating to form a film of the photoalignment material. The film of the photoalignment material was pre-baked at 80° C. for one minute, so that an alignment film for the first λ/4 retardation layer 3 was formed. A photopolymerizable liquid crystal material (liquid crystal material having an acrylate group at a terminal of its skeleton; refractive index anisotropy Δn=0.14) was dissolved in propylene glycol monomethyl ether acetate (organic solvent), so that a coating liquid was prepared. The coating liquid was applied to the surface of the alignment film for the first λ/4 retardation layer 3 by slit coating, and thereby a coating film was formed. The coating film was pre-baked at 90° C. for 80 seconds, and irradiated with ultraviolet rays (irradiation dose at a wavelength of 365 nm: 500 mJ/cm$^2$), so that the first λ/4 retardation layer 3 was formed. Thereby, a laminate was formed in which the first λ/4 retardation layer 3, the alignment film for the first λ/4 retardation layer 3, and the polyethylene terephthalate film were sequentially stacked. The first λ/4 retardation layer 3 side of this laminate was bonded to the surface remote from the liquid crystal layer 6 (viewing surface side) of the first substrate 4 with an adhesive, and then the polyethylene terephthalate film was peeled off. The first λ/4 retardation layer 3 had the following specifications.

Thickness: 1.0 μm
In-plane retardation: 140 nm
In-plane slow axis azimuth: −45°

<First Substrate>

The first substrate 4 used was a color filter substrate which included the following members.

(First Supporting Substrate)

The first supporting substrate 9 used was a glass substrate whose thickness was 0.7 mm.

(Black Matrix)

The black matrix 10 used was one formed of a black resist (light-shielding ratio: 99.9%) and had a thickness of 1.0 μm and a width in the frame region FR of 700 μm.

(Color Filter Layer)

The color filter layer 11R (edge color filter layer 17R) used was one formed of a pigment-dispersed color resist (red) and had a thickness of 2.4 μm, a length of 75 μm, and a width of 25 μm. The color filter layer 11G used was one formed of a pigment-dispersed color resist (green) and had a thickness of 2.5 μm, a length of 75 μm, and a width of 25 μm. The color filter layer 11B (edge color filter layer 17B) used was one formed of a pigment-dispersed color resist (blue) and had a thickness of 2.6 μm, a length of 75 μm, and a width of 25 μm.

(Overcoat Layer)

The overcoat layer 12 used was one formed of a transparent resin and had a thickness of 1.3 μm in the central region of the display region AR.

<Liquid Crystal Layer>

The liquid crystal layer 6 was formed of a negative liquid crystal material (anisotropy of dielectric constant Δε: −3.6). The alignment direction (with no voltage applied) of the liquid crystal molecules in the liquid crystal layer 6 was 90°.

<Second Substrate>

The second substrate 7 used was an FFS mode thin-film transistor array substrate which included the following members. On the liquid crystal layer 6 side surface of the second substrate 7 (viewing surface side) was disposed the same alignment film as that for the liquid crystal layer 6.

(Second Supporting Substrate)

The second supporting substrate 16 used was a glass substrate whose thickness was 0.7 mm.

(Common Electrode)

The common electrode 15 used was one formed of indium zinc oxide.

(Insulating Film)

The insulating film 14 used was one formed of silicon nitride and had a thickness of 300 nm.

(Pixel Electrode)

The pixel electrodes 13 used were those formed of indium zinc oxide.

<Second Polarizer>

The second polarizer 8 used was one obtained by dyeing a polyvinyl alcohol film with an iodine complex (or dye) to adsorb the iodine complex on the polyvinyl alcohol film, and stretching the film for alignment (absorptive polarizer). The second polarizer 8 had its transmission axis at an azimuth of 90°.

Example 2

A liquid crystal display panel of Example 2 was the liquid crystal display panel of the embodiment produced by the method in Production Method Example 2. The liquid crystal display panel of Example 2 was produced as with the liquid crystal display panel of Example 1, except for the light irradiation in formation of the second λ/4 retardation layer 5.

<Formation of Second λ/4 Retardation Layer: Light Irradiation>

The coating film 20 was irradiated with ultraviolet rays through the photomask 23 once, so that a cured product of the coating film 20 was formed.

The ultraviolet ray irradiation intensity M of the light source at a wavelength of 365 nm was 33 mW/cm$^2$. In the photomask 23, the third mask portion 26 had an ultraviolet ray transmittance T1 of 10%, the first mask portion 24 had an ultraviolet ray transmittance that linearly increases from the ultraviolet ray transmittance T1 (10%) to the ultraviolet ray transmittance T2 (90%) from the third mask portion 26 side toward the second mask portion 25 side, and the second mask portion 25 had an ultraviolet ray transmittance T2 of 90%. This made the ultraviolet ray irradiation intensity M×T1 for the first coating film portion 21, which was 3.3 mW/cm$^2$, lower than the ultraviolet ray irradiation intensity M×T2 for the second coating film portion 22, which was 29.7 mW/cm$^2$. Also, since the ultraviolet ray irradiation was performed such that the ultraviolet ray irradiation dose for the second coating film portion 22 was 200 mJ/cm$^2$, the ultraviolet ray irradiation dose for the first coating film portion 21 was 22.2 mJ/cm$^2$.

Example 3

A liquid crystal display panel of Example 3 was the liquid crystal display panel of the embodiment produced by the method in Production Method Example 3. The liquid crystal display panel of Example 3 was produced as with the liquid crystal display panel of Example 1, except for the light irradiation in formation of the second λ/4 retardation layer 5.

<Formation of Second λ/4 Retardation Layer: Light Irradiation>

The coating film 20 was irradiated with ultraviolet rays twice as described below, so that a cured product of the coating film 20 was formed.

The first ultraviolet ray irradiation for the coating film 20 was performed through the photomask 23. The ultraviolet ray irradiation intensity M1 of the light source at a wavelength of 365 nm was 30 mW/cm$^2$. In the photomask 23, the first mask portion 24 had an ultraviolet ray transmittance of 0%, and the second mask portion 25 had an ultraviolet ray transmittance T2 of 90%. This resulted in the first ultraviolet ray irradiation in which the ultraviolet ray irradiation intensity for the first coating film portion 21 was 0 mW/cm$^2$ and the ultraviolet ray irradiation intensity M1×T2 for the second coating film portion 22 was 27 mW/cm$^2$. The ultraviolet ray irradiation dose for the second coating film portion 22 was 200 mJ/cm$^2$.

The second ultraviolet ray irradiation for the coating film 20 was performed without any photomask. The ultraviolet ray irradiation intensity M2 of the light source at a wavelength of 365 nm was 3 mW/cm$^2$. This resulted in the second ultraviolet ray irradiation in which the ultraviolet ray irradiation intensities M2 for the first coating film portion 21 and the second coating film portion 22 were both 3 mW/cm$^2$. The ultraviolet ray irradiation doses for the first coating film portion 21 and the second coating film portion 22 were both 200 mJ/cm$^2$.

The ultraviolet ray irradiation was repeated twice as described above, and this made the ultraviolet ray irradiation intensity M2 for the first coating film portion 21, which was 3 mW/cm$^2$, lower than the ultraviolet ray irradiation intensity M1×T2+M2 for the second coating film portion 22, which was 30 mW/cm$^2$.

Comparative Example 1

Figure 7:
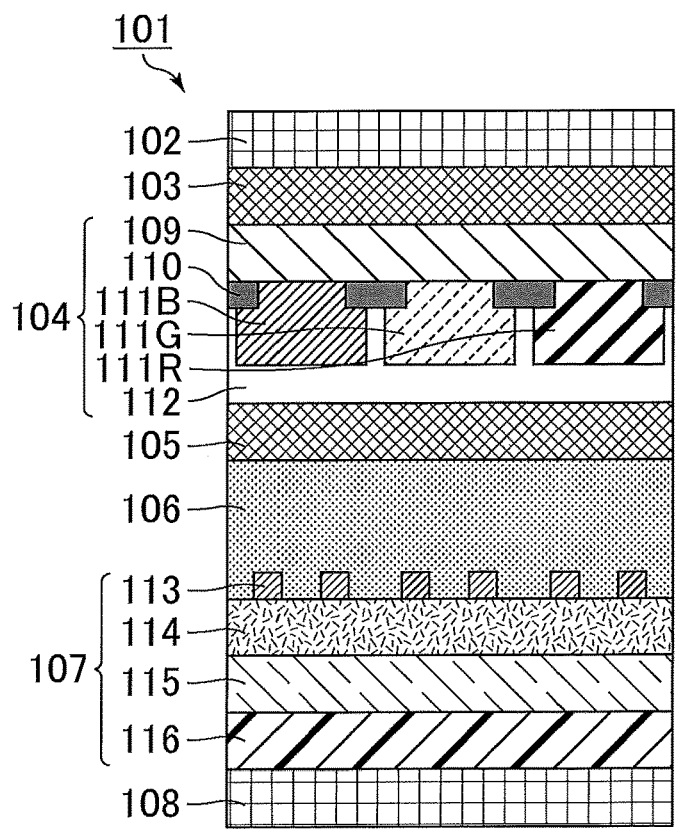
FIG. 7 is a schematic cross-sectional view of a liquid crystal display panel of Comparative Example 1.

A liquid crystal display panel of Comparative Example 1 is described below with reference to FIG. 7. FIG. 7 is a schematic cross-sectional view of a liquid crystal display panel of Comparative Example 1.

A liquid crystal display panel 101 includes, in the following order from the viewing surface side to the back surface side, a first polarizer 102, a first λ/4 retardation layer (out-cell retardation layer) 103, a first substrate 104, a second λ/4 retardation layer (in-cell retardation layer) 105, a liquid crystal layer 106, a second substrate 107, and a second polarizer 108.

The first substrate 104 includes a first supporting substrate 109, a black matrix 110 disposed on part of the liquid crystal layer 106 side (back surface side) surface of the first supporting substrate 109, color filter layers 111R (red), 111G (green), and 111B (blue), and an overcoat layer 112 covering the black matrix 110 and the color filter layers 111R, 111G, and 111B directly.

The second substrate 107 includes a second supporting substrate 116, a common electrode 115 on the liquid crystal layer 106 side (viewing surface side) surface of the second supporting substrate 116, an insulating film 114 covering the common electrode 115, and pixel electrodes 113 on the liquid crystal layer 106 side (viewing surface side) surface of the insulating film 114.

The relationship between the second λ/4 retardation layer 105 and the first substrate 104 is described below.

Figure 8:
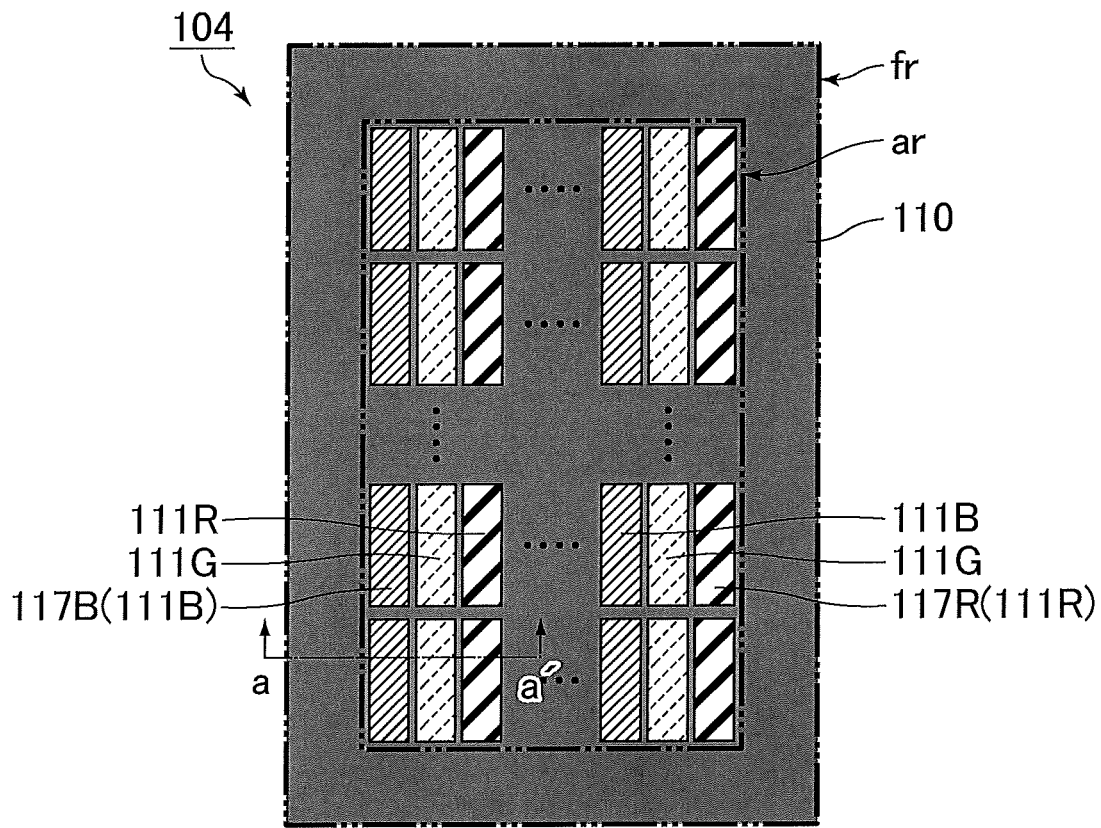
FIG. 8 is a schematic plan view of the liquid crystal display panel of Comparative Example 1, showing a second $\lambda/4$ retardation layer and a first substrate as viewed from the liquid crystal layer side (back surface side).

FIG. 8 is a schematic plan view of the liquid crystal display panel of Comparative Example 1, showing a second λ/4 retardation layer and a first substrate as viewed from the liquid crystal layer side (back surface side). As shown in FIG. 8, the first substrate 104 includes the color filter layers 111R, 111G, and 111B in the display region ar where image(s) or letter(s), for example, are displayed. Among these color filter layers, an edge color filter layer 117B (blue: color filter layer 111B) is disposed in the left end region of the display region ar, while an edge color filter layer 117R (red: color filter layer 111R) is disposed in the right end region of the display region ar. The black matrix 110 is disposed in a grid pattern to define the color filter layers 111R, 111G, and 111B in the display region ar, and is disposed on the entire surface in a frame region (non-display region) fr surrounding the display region ar.

Figure 9:
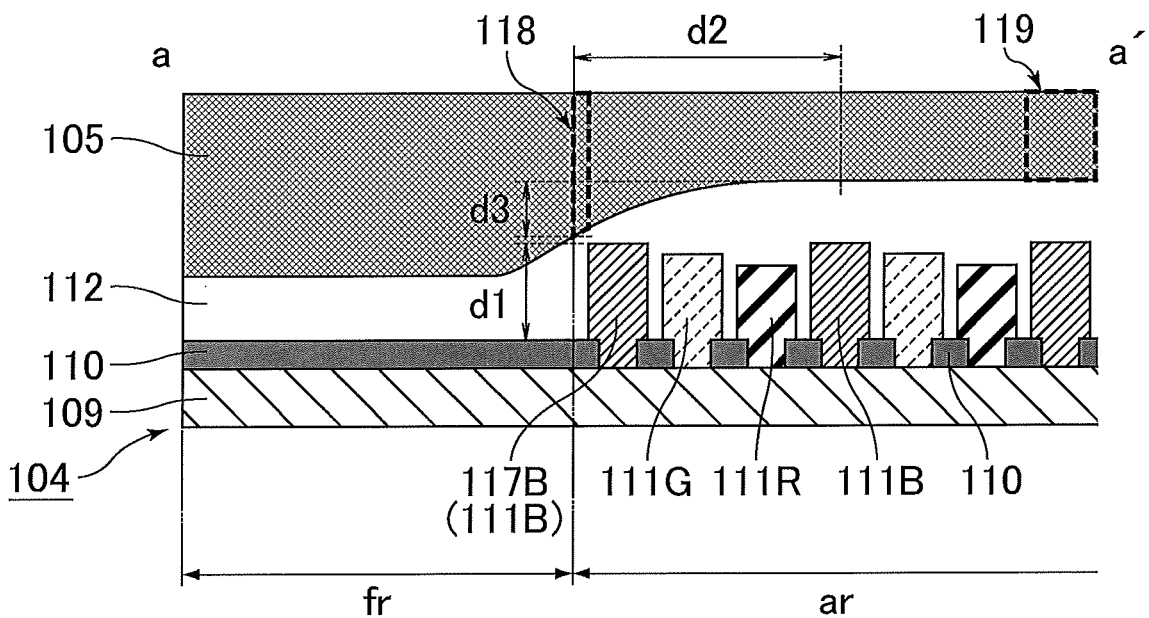
FIG. 9 is a schematic cross-sectional view of a portion corresponding to the line a-a' in FIG. 8.

FIG. 9 is a schematic cross-sectional view of a portion corresponding to the line a-a' in FIG. 8. As shown in FIG. 9, in the first substrate 104, the overcoat layer 112 covers the black matrix 110 and the color filter layers 111R, 111G, and 111B (117B) directly in the display region ar, while covering the black matrix 110 directly in the frame region fr.

The second λ/4 retardation layer 105 is a single layer (is jointless) and includes a first retardation portion 118 in an end region of the display region ar and a second retardation portion 119 in the central region of the display region ar. The second λ/4 retardation layer 105 covers the overcoat layer 112 directly in the display region ar and the frame region fr. In other words, the second λ/4 retardation layer 105 covers, with the overcoat layer 112 in between, the color filter layers 111R, 111G, and 111B (117B) in the display region ar and covers the black matrix 110 in the frame region fr.

Figure 10:
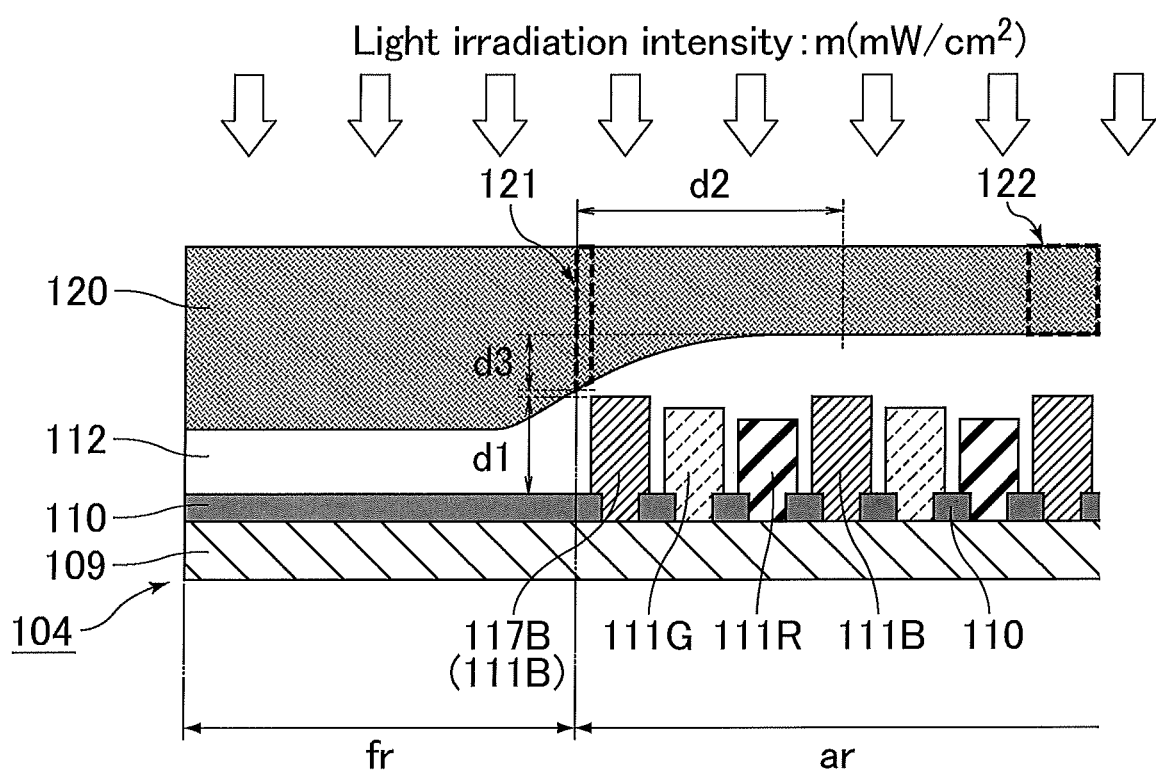
FIG. 10 is a schematic cross-sectional view for describing a method for producing the liquid crystal display panel of Comparative Example 1.

The method for producing the liquid crystal display panel of Comparative Example 1 is described below with reference to FIG. 10 as well as FIGS. 7 to 9. FIG. 10 is a schematic cross-sectional view for describing a method for producing the liquid crystal display panel of Comparative Example 1.

<Formation of Alignment Film for Second λ/4 Retardation Layer>

A photoisomerizable photoalignment material was applied to a surface of the first substrate 104 to form a film of the photoalignment material. This film of the photoalignment material was pre-baked at 60° C. for 80 seconds, and then irradiated with polarized ultraviolet rays (irradiation dose at a wavelength of 365 nm: 100 mJ/cm$^2$), followed by post-baking at 230° C. for 30 minutes. Thereby, the alignment film for the second λ/4 retardation layer 105 was formed.

<Formation of Second λ/4 Retardation Layer: Application>

A photopolymerizable liquid crystal material (whose liquid crystal molecules have an acrylate group at a terminal of their skeleton; refractive index anisotropy Δn: 0.1657) was dissolved in propylene glycol monomethyl ether acetate (organic solvent), so that a coating liquid was prepared. The coating liquid was applied to the first substrate 104 to cover the color filter layers 111R, 111G, and 111B (technically the alignment film for the second λ/4 retardation layer 105) by slit coating, and thereby a single layer coating film 120 was formed. The coating film 120 was then pre-baked at 90° C. for 80 seconds. The coating film 120 included a first coating film portion 121 being positioned in the end region of the display region ar and a second coating film portion 122 being positioned in the central region of the display region ar and having a smaller thickness than the first coating film portion 121.

<Formation of Second λ/4 Retardation Layer: Light Irradiation>

As shown in FIG. 10, the coating film 120 was irradiated with ultraviolet rays once without any photomask, so that a cured product of the coating film 120 was formed.

The ultraviolet ray irradiation intensity m of the light source at a wavelength of 365 nm was 30 mW/cm$^2$. Thereby, the ultraviolet ray irradiation intensities m for the first coating film portion 121 and the second coating film portion 122 were both 30 mW/cm$^2$. The ultraviolet ray irradiation doses for the first coating film portion 121 and the second coating film portion 122 were both 200 mJ/cm$^2$.

The surface of the edge color filter layer 117B in the display region ar was positioned higher than the surface of the black matrix 110 in the frame region fr, which produced a height difference d1 between the two regions of 1.6 μm. Thereby, the overcoat layer 112 had a thickness that was smaller in the region from the end region of the display region ar to the point which was the distance d2 (0.1 mm) away from the end region than the central region in the display region ar by at most the difference d3 (0.1 μm). Hence, the cured product of the coating film 120 had a greater thickness in the region from the end region of the display region ar to the point which was the distance d2 (0.1 mm) away from the end region than in the central region in the display region ar by at most the difference d3 (0.1 μm). In other words, in the cured product of the coating film 120, the cured product of the first coating film portion 121 in the end region of the display region ar had a greater thickness than the cured product of the second coating film portion 122 in the central region in the display region ar, which was 1.05 μm, by the difference d3 (0.1 μm), i.e., the cured product of the first coating film portion 121 in the end region of the display region ar had a thickness of 1.15 μm.

<Formation of Second λ/4 Retardation Layer: Heating>

The cured product of the coating film 120 was post-baked at 230° C. for 30 minutes, so that the second λ/4 retardation layer 105 as shown in FIG. 9 was formed. The second λ/4 retardation layer 105 had its in-plane slow axis at an azimuth of 45°.

The second λ/4 retardation layer 105 had a greater thickness in the region from the end region of the display region ar to the point which was the distance d2 (0.1 mm) away from the end region than the central region of the display region ar by at most the difference d3 (0.1 μm). In other words, in the second λ/4 retardation layer 105, the first retardation portion 118 was positioned in the end region of the display region ar and had a greater thickness than the second retardation portion 119 being positioned in the central region of the display region ar, which had a thickness of 1.05 μm, by the difference d3 (0.1 μm), i.e., the first retardation portion 118 had a thickness of 1.15 μm.
<Formation of Photo Spacer>

A photoresist was applied to the surface remote from the first substrate 104 of the second λ/4 retardation layer 105. The applied photoresist was patterned by photolithography and baked at 230° C. for 30 minutes, whereby photo spacers were formed.
<Formation of Alignment Film for Liquid Crystal Layer>

A photoisomerizable photoalignment material was applied to the surface remote from the first substrate 104 of the second λ/4 retardation layer 105 (with photo spacers) to form a film of the photoalignment material. The film of the photoalignment material was pre-baked at 90° C. for 80 seconds, irradiated with polarized ultraviolet rays (irradiation dose at a wavelength of 365 nm: 5 J/cm$^2$), followed by post-baking at 220° C. for 35 minutes. Thereby, an alignment film for the liquid crystal layer 106 was formed.
<Completion of Liquid Crystal Display Panel>

The first substrate 104 on which layers including the second λ/4 retardation layer 105 were stacked and the second substrate 107 were bonded to each other with the liquid crystal layer 106 being sandwiched in between, followed by stacking the first polarizer 102, the first λ/4 retardation layer 103, and the second polarizer 108 on the bonded product. Thereby, the liquid crystal display panel of Comparative Example 1 as shown in FIG. 7 was completed.

The members included in the liquid crystal display panel of Comparative Example 1 other than the second λ/4 retardation layer 105 were as follows.
<First Polarizer>

The first polarizer 102 used was one (absorptive polarizer) obtained by dyeing a polyvinyl alcohol film with an iodine complex (or dye) to adsorb the iodine complex on the polyvinyl alcohol film, and stretching the film for alignment. The first polarizer 102 had its transmission axis at an azimuth of 0°.
<First λ/4 Retardation Layer>

The first λ/4 retardation layer 103 used was one formed by the following method. A photoisomerizable photoalignment material was applied to the surface of a polyethylene terephthalate film by slit coating to form a film of the photoalignment material. The film of the photoalignment material was pre-baked at 80° C. for one minute, so that an alignment film for the first λ/4 retardation layer 103 was formed. A photopolymerizable liquid crystal material (liquid crystal material having an acrylate group at a terminal of its skeleton; refractive index anisotropy Δn=0.14) was dissolved in propylene glycol monomethyl ether acetate (organic solvent), so that a coating liquid was prepared. The coating liquid was applied to the surface of the alignment film for the first λ/4 retardation layer 103 by slit coating, and thereby a coating film was formed. The coating film was pre-baked at 90° C. for 80 seconds, and irradiated with ultraviolet rays (irradiation dose at a wavelength of 365 nm: 500 mJ/cm$^2$), so that the first λ/4 retardation layer 103 was formed. Thereby, a laminate was formed in which the first λ/4 retardation layer 103, the alignment film for the first λ/4 retardation layer 103, and the polyethylene terephthalate film were sequentially stacked. The first λ/4 retardation layer 103 side of this laminate was bonded to the surface remote from the liquid crystal layer 106 (viewing surface side) of the first substrate 104 with an adhesive, and then the polyethylene terephthalate film was peeled off. The first λ/4 retardation layer 103 had the following specifications.
Thickness: 1.0 μm
In-plane retardation: 140 nm
In-plane slow axis azimuth: −45°
<First Substrate>

The first substrate 104 used was a color filter substrate which included the following members.
(First Supporting Substrate)

The first supporting substrate 109 used was a glass substrate whose thickness was 0.7 mm.
(Black Matrix)

The black matrix 110 used was one formed of a black resist (light-shielding ratio: 99.9%) and had a thickness of 1.0 μm and a width in the frame region fr of 700 μm.
(Color Filter Layer)

The color filter layer 111R (edge color filter layer 117R) used was one formed of a pigment-dispersed color resist (red) and had a thickness of 2.4 μm, a length of 75 μm, and a width of 25 μm. The color filter layer 111G used was one formed of a pigment-dispersed color resist (green) and had a thickness of 2.5 μm, a length of 75 μm, and a width of 25 μm. The color filter layer 111B (edge color filter layer 117B) used was one formed of a pigment-dispersed color resist (blue) and had a thickness of 2.6 μm, a length of 75 μm, and a width of 25 μm.
(Overcoat Layer)

The overcoat layer 112 used was one formed of a transparent resin and had a thickness of 1.3 μm in the central region of the display region ar.
<Liquid Crystal Layer>

The liquid crystal layer 106 was formed of a negative liquid crystal material (anisotropy of dielectric constant Δε: −3.6). The alignment direction (with no voltage applied) of the liquid crystal molecules in the liquid crystal layer 106 was 90°.
<Second Substrate>

The second substrate 107 used was an FFS mode thin-film transistor array substrate which included the following members. On the liquid crystal layer 106 side surface of the second substrate 107 (viewing surface side) was disposed the same alignment film as that for the liquid crystal layer 106.
(Second Supporting Substrate)

The second supporting substrate 116 used was a glass substrate whose thickness was 0.7 mm.
(Common Electrode)

The common electrode 115 used was one formed of indium zinc oxide.
(Insulating Film)

The insulating film 114 used was one formed of silicon nitride and had a thickness of 300 nm.
(Pixel Electrode)

The pixel electrodes 113 used were those formed of indium zinc oxide.
<Second Polarizer>

The second polarizer 108 used was one obtained by dyeing a polyvinyl alcohol film with an iodine complex (or dye) to adsorb the iodine complex on the polyvinyl alcohol film, and stretching the film for alignment (absorptive polarizer). The second polarizer 108 had its transmission axis at an azimuth of 90°.
[Evaluation 1]

Evaluations were made regarding how the in-plane retardation of the first retardation portion (cured product of first coating film portion) and the in-plane retardation of the second retardation portion (cured product of second coating film portion) in the second λ/4 retardation layer (cured product of coating film) changed during production (after the light irradiation in formation of the second λ/4 retardation layer) of the liquid crystal display panels of Example 1 and Comparative Example 1. The results are shown in Tables 1 and 2.

TABLE 1

| Example 1 | | First retardation portion (cured product of first coating film portion) | Second retardation portion (cured product of second coating film portion) | Difference |
|---|---|---|---|---|
| | | In-plane retardation (nm) | | |
| Formation of second λ/4 retardation layer | After light irradiation | 190.5 | 174.0 | 16.5 |
| | After post-baking | 156.0 | 150.3 | 5.7 |
| Formation of photo spacers | After baking | 149.7 | 145.6 | 4.1 |
| Formation of alignment film for liquid crystal layer | After pre-baking | 144.8 | 140.2 | 4.6 |
| | After polarized ultraviolet ray irradiation | 142.5 | 140.1 | 2.4 |
| | After post-baking | 140.0 | 140.0 | 0 |

TABLE 2

| Comparative Example 1 | | First retardation portion (cured product of first coating film portion) | Second retardation portion (cured product of second coating film portion) | Difference |
|---|---|---|---|---|
| | | In-plane retardation (nm) | | |
| Formation of second λ/4 retardation layer | After light irradiation | 190.5 | 174.0 | 16.5 |
| | After post-baking | 164.6 | 150.3 | 14.3 |
| Formation of photo spacers | After baking | 159.4 | 145.6 | 13.8 |
| Formation of alignment film for liquid crystal layer | After pre-baking | 153.5 | 140.2 | 13.3 |
| | After polarized ultraviolet ray irradiation | 153.4 | 140.1 | 13.3 |
| | After post-baking | 153.3 | 140.0 | 13.3 |

As shown in Table 1, in Example 1, the difference in in-plane retardation between the first retardation portion (cured product of the first coating film portion) and the second retardation portion (cured product of the second coating film portion) was more than 10 nm immediately after the light irradiation in formation of the second λ/4 retardation layer. The difference became 10 nm or less after at least one heating process, and eventually became 0 nm when the liquid crystal display panel was completed. This is because the light irradiation in formation of the second λ/4 retardation layer included ultraviolet ray irradiation performed such that the ultraviolet ray irradiation intensity for the first coating film portion was lower than the ultraviolet ray irradiation intensity for the second coating film portion, which led to the state where the heat resistance of the first retardation portion (cured product of the first coating film portion) was lower than the heat resistance of the second retardation portion (cured product of the second coating film portion). In other words, the heating made the in-plane retardation of the first retardation portion (cured product of the first coating film portion) more likely to decrease than the in-plane retardation of the second retardation portion (cured product of the second coating film portion). Thereby, when the end region of the display region of the liquid crystal display panel of Example 1 in the black display state was visually observed in a darkroom (in an environment with an illuminance of 0.1 lx or lower), no light leakage was observed.

In contrast, as shown in Table 2, in Comparative Example 1, the difference in in-plane retardation between the first retardation portion (cured product of the first coating film portion) and the second retardation portion (cured product of the second coating film portion) was more than 10 nm immediately after the light irradiation in formation of the second λ/4 retardation layer, and was still more than 10 nm after the heating. This is because the light irradiation in formation of the second λ/4 retardation layer included ultraviolet ray irradiation performed such that the ultraviolet ray irradiation intensity for the first coating film portion and the ultraviolet ray irradiation intensity for the second coating film portion were the same, which led to the state where the heat resistance of the first retardation portion (cured product of the first coating film portion) and the heat resistance of the second retardation portion (cured product of the second coating film portion) were the same. Thereby, when the end region of the display region of the liquid crystal display panel of Comparative Example 1 in the black display state was visually observed in a darkroom (in an environment with an illuminance of 0.1 lx or lower), light leakage was observed.

Also, evaluations were made on the liquid crystal display panels of Examples 2 and 3 in the same manner as above. When the end region of the display region in the black display state was visually observed in a darkroom (in an environment with an illuminance of 0.1 lx or lower), no light leakage was observed. In particular, the liquid crystal display panel of Example 2 did not cause light leakage even in observation with a polarization microscope, and thus had even better display quality.

[Evaluation 2]

The coating film for the second λ/4 retardation layer formation used in Examples 1 to 3 was irradiated with ultraviolet rays without any photomask. Evaluations were made on how the in-plane retardation (central region of the display region) of the resulting second λ/4 retardation layer (cured product of the coating film) changed during the same process as in Evaluation 1, with different ultraviolet ray irradiation intensities and different ultraviolet ray irradiation doses. The results are shown in Tables 3 and 4. The "normalized in-plane retardation" in Tables 3 and 4 was obtained by normalizing the in-plane retardation after each process relative to the in-plane retardation after the light irradiation in formation of the second λ/4 retardation layer (100%).

TABLE 3

| Ultraviolet ray irradiation intensity (mW/cm$^2$) | | | 3.3 | | |
|---|---|---|---|---|---|
| Ultraviolet ray irradiation dose (mJ/cm$^2$) | | | 100 | 200 | 300 |
| Normalized in-plane retardation (%) | Formation of second λ/4 retardation layer | After light irradiation | 100 | 100 | 100 |
| | | After post-baking | 81 | 82 | 81 |
| | Formation of photo spacers | After baking | 78 | 79 | 79 |
| | Formation of alignment film for liquid crystal layer | After pre-baking | 75 | 76 | 76 |
| | | After polarized ultraviolet ray irradiation | 75 | 76 | 75 |
| | | After post-baking | 73 | 74 | 74 |

TABLE 4

| Ultraviolet ray irradiation intensity (mW/cm$^2$) | | | 30 | | |
|---|---|---|---|---|---|
| Ultraviolet ray irradiation dose (mJ/cm$^2$) | | | 100 | 200 | 300 |
| Normalized in-plane retardation (%) | Formation of second λ/4 retardation layer | After light irradiation | 100 | 100 | 100 |
| | | After post-baking | 88 | 88 | 89 |
| | Formation of photo spacers | After baking | 86 | 86 | 87 |
| | Formation of alignment film for liquid crystal layer | After pre-baking | 83 | 83 | 83 |
| | | After polarized ultraviolet ray irradiation | 82 | 82 | 83 |
| | | After post-baking | 82 | 82 | 82 |

Comparison of Tables 3 and 4 shows that increasing the ultraviolet ray irradiation intensity in forming the second λ/4 retardation layer reduces a decrease in the in-plane retardation after each of the subsequent processes. The comparison also shows that how much the in-plane retardation decreases depends on the ultraviolet ray irradiation intensity, but hardly depends on the ultraviolet ray irradiation dose. The results therefore show that when ultraviolet ray irradiation is performed such that the ultraviolet ray irradiation intensity for the first coating film portion is lower than the ultraviolet ray irradiation intensity for the second coating film portion in the light irradiation in formation of the second λ/4 retardation layer as in Examples 1 to 3, the state is achieved where the heat resistance of the first retardation portion (cured product of the first coating film portion) is lower than the heat resistance of the second retardation portion (cured product of the second coating film portion).

[Additional Remarks]

One aspect of the present invention may be a liquid crystal display panel comprising in the following order from a viewing surface side to a back surface side: a first polarizer; a first λ/4 retardation layer; a first substrate; a second λ/4 retardation layer; a liquid crystal layer; a second substrate; and a second polarizer, the liquid crystal display panel being in a transverse electric field mode, the first substrate including a color filter layer in a display region, the second λ/4 retardation layer being a single layer covering the color filter layer and including a first retardation portion in an end region of the display region and a second retardation portion in a central region of the display region, the first retardation portion having a greater thickness than the second retardation portion, and the first retardation portion and the second retardation portion differing from each other in in-plane retardation by 10 nm or less. This aspect achieves a transverse electric field mode liquid crystal display panel with reduced light leakage in the end region of the display region.

In this aspect of the present invention, the first retardation portion and the second retardation portion may differ from each other in in-plane retardation by 6 nm or less. This sufficiently reduces light leakage in the end region of the display region.

In this aspect of the present invention, the first retardation portion and the second retardation portion may differ from each other in thickness by 0.08 μm or more. This reduces light leakage in the end region of the display region even when the first retardation portion has a significantly greater thickness than the second retardation portion.

In this aspect of the present invention, the first substrate may further include an overcoat layer that covers the color filter layer directly. This allows use of the overcoat layer as a flattening layer for the color filter layer.

Another aspect of the present invention may be a method for producing a liquid crystal display panel, the liquid crystal display panel including in the following order from a viewing surface side to a back surface side: a first polarizer; a first λ/4 retardation layer; a first substrate; a second λ/4 retardation layer; a liquid crystal layer; a second substrate; and a second polarizer, the liquid crystal display panel being in a transverse electric field mode, the first substrate including a color filter layer in a display region, the method including: applying a coating liquid containing a photopolymerizable material to the first substrate to cover the color filter layer so as to form a single layer coating film that includes a first coating film portion being positioned in an end region of the display region and a second coating film portion being positioned in a central region of the display region and having a smaller thickness than the first coating film portion; irradiating the coating film with light at least once so as to form a cured product of the coating film; and heating the cured product of the coating film so as to form the second λ/4 retardation layer, the irradiating the coating film including irradiating the coating film with light such that a light irradiation intensity for the first coating film portion is lower than a light irradiation intensity for second coating film portion. This aspect enables production of a transverse electric field mode liquid crystal display panel with reduced light leakage in the end region of the display region.

In this aspect of the present invention, the irradiating the coating film may include irradiating the coating film with light through a photomask once, and the photomask may include a first mask portion corresponding to the position of the first coating film portion and a second mask portion corresponding to the position of the second coating film portion, the first mask portion having a lower light transmittance than the second mask portion. This enables efficient production of a transverse electric field mode liquid crystal display panel with reduced light leakage in the end region of the display region.

In this aspect of the present invention, the irradiating the coating film may include irradiating the coating film with light twice in first irradiation and second irradiation, the first irradiation may be performed through a photomask whose first mask portion, corresponding to the position of the first coating film portion, has a light transmittance of 0% and whose second mask portion, corresponding to the position of the second coating film portion, has a light transmittance of 90% or higher, the second irradiation may be performed without any photomask, and the first irradiation and the second irradiation may use light sources having different light irradiation intensities. This enables efficient production of a transverse electric field mode liquid crystal display panel with reduced light leakage in the end region of the display region. Also, the light irradiation dose for the end region of the display region can be increased similarly to the central region of the display region. Thereby, the amount of an uncured photopolymerizable material decreases in the resulting second λ/4 retardation layer, so that the reliability of the liquid crystal display panel increases.

What is claimed is:

1. A liquid crystal display panel comprising in the following order from a viewing surface side to a back surface side:
a first polarizer;
a first λ/4 retardation layer;
a first substrate;
a second λ/4 retardation layer;
a liquid crystal layer;
a second substrate; and
a second polarizer,
the liquid crystal display panel being in a transverse electric field mode, and including a display region and a frame region surrounding the display region when viewed in plan,
the first substrate including a color filter layer in the display region,
the second λ/4 retardation layer being a single layer covering the color filter layer and including a first retardation portion in an end region of the display region and a second retardation portion in a central region of the display region, the end region of the display region being defined as a region between an end of the color filter layer on the frame region side and a boundary between the display region and the frame region,
the first retardation portion being formed of a first liquid crystal material and the second retardation portion being formed of a second liquid crystal material which has substantially same composition as the first liquid crystal material,
the first retardation portion having a refractive index anisotropy different from that of the second retardation portion,
the first retardation portion having a greater thickness than the second retardation portion, and
the first retardation portion and the second retardation portion differing from each other in in-plane retardation by 10 nm or less.

2. The liquid crystal display panel according to claim 1, wherein the first retardation portion and the second retardation portion differ from each other in in-plane retardation by 6 nm or less.

3. The liquid crystal display panel according to claim 1, wherein the first retardation portion and the second retardation portion differ from each other in thickness by 0.08 μm or more.

4. The liquid crystal display panel according to claim 1, wherein the first substrate further includes an overcoat layer that covers the color filter layer directly.

5. A method for producing a liquid crystal display panel, the liquid crystal display panel comprising in the following order from a viewing surface side to a back surface side: a first polarizer; a first λ/4 retardation layer; a first substrate; a second λ/4 retardation layer; a liquid crystal layer; a second substrate; and a second polarizer,
the liquid crystal display panel being in a transverse electric field mode, and including a display region and a frame region surrounding the display region when viewed in plan, and
the first substrate including a color filter layer in the display region,
the method comprising:
applying a coating liquid containing a photopolymerizable material to the first substrate to cover the color filter layer so as to form a single layer coating film that includes a first coating film portion being positioned in an end region of the display region and a second coating film portion being positioned in a central region of the display region and having a smaller thickness than the first coating film portion, the end region of the display region being defined as a region between an end of the color filter layer on the frame region side and a boundary between the display region and the frame region;
irradiating the coating film with light at least once so as to form a cured product of the coating film; and
heating the cured product of the coating film so as to form the second λ/4 retardation layer,
the irradiating the coating film including simultaneously irradiating the first coating film portion and the second coating film portion with light through single photomask such that a light irradiation intensity for the first coating film portion is lower than a light irradiation intensity for the second coating film portion.

6. The method for producing a liquid crystal display panel according to claim 5,
wherein the irradiating the coating film includes irradiating the coating film with light through the photomask once, and
the photomask includes a first mask portion corresponding to the position of the first coating film portion and a second mask portion corresponding to the position of the second coating film portion, the first mask portion having a lower light transmittance than the second mask portion.

7. The method for producing a liquid crystal display panel according to claim 5,
wherein the irradiating the coating film includes irradiating the coating film with light twice in first irradiation and second irradiation,
the first irradiation is performed through the photomask whose first mask portion, corresponding to the position of the first coating film portion, has a light transmittance of 0% and whose second mask portion, corresponding to the position of the second coating film portion, has a light transmittance of 90% or higher,
the second irradiation is performed without any photomask, and
the first irradiation and the second irradiation use light sources having different light irradiation intensities.

8. The method for producing a liquid crystal display panel according to claim 5, the method further comprising:
pre-baking the coating film before irradiating the coating film with light.

* * * * *